(12) United States Patent
Starr et al.

(10) Patent No.: US 6,814,323 B2
(45) Date of Patent: Nov. 9, 2004

(54) FOOD PROCESSOR

(75) Inventors: Dane Starr, Powhatan, VA (US); Jeffery Thomas Mauch, Mechanicsville, VA (US); Michael M. Pierce, Richmond, VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 6 days.

(21) Appl. No.: 10/164,759

(22) Filed: Jun. 7, 2002

(65) Prior Publication Data

US 2003/0226923 A1 Dec. 11, 2003

(51) Int. Cl.$^7$ ............................................. B02C 18/18
(52) U.S. Cl. ................................. 241/282.2; 241/292.1
(58) Field of Search ....................... 241/93, 191, 282.2, 241/199.12, 282.1, 292.1; 99/501, 503

(56) References Cited

U.S. PATENT DOCUMENTS

| | | | |
|---|---|---|---|
| 3,892,365 A | 7/1975 | Verdun | |
| 4,081,145 A | 3/1978 | Moe et al. | |
| 4,143,824 A | 3/1979 | Shiotani | |
| 4,173,310 A | 11/1979 | Schaeffer | |
| 4,194,697 A | 3/1980 | Lembeck | |
| 4,213,570 A | 7/1980 | Jones | |
| 4,240,338 A | 12/1980 | McClean | |
| D259,992 S | 7/1981 | Kahlcke | |
| 4,331,300 A | 5/1982 | Hicks et al. | |
| 4,334,724 A | 6/1982 | Rogers, Sr. | |
| 4,364,525 A | 12/1982 | McClean | |
| 4,373,677 A | 2/1983 | Kunihiro | |
| 4,387,860 A | 6/1983 | Necas et al. | |
| 4,448,100 A | 5/1984 | Breeden | |
| 4,700,903 A | 10/1987 | Henn | |
| D325,322 S | 4/1992 | Maass | |
| D335,065 S | 4/1993 | Gildersleeve | |
| 5,222,430 A | 6/1993 | Wang | |
| 6,007,011 A * | 12/1999 | McBain | 241/282.1 |
| D433,871 S | 11/2000 | Wong | |
| D434,271 S | 11/2000 | Naft et al. | |
| 6,364,226 B1 * | 4/2002 | Kubicko | 241/36 |
| 6,467,948 B1 * | 10/2002 | Lawson | 241/282.1 |

FOREIGN PATENT DOCUMENTS

CA 1 078 291 5/1980

OTHER PUBLICATIONS

GE Food Processor Manual, Admitted Prior Art.

* cited by examiner

Primary Examiner—Allen Ostrager
Assistant Examiner—Jimmy T Nguyen
(74) Attorney, Agent, or Firm—Akin Gump Strauss Hauer & Feld, LLP

(57) ABSTRACT

A food processor for processing foodstuffs including a housing having a motor covering a base. The food processor further including a driveshaft, a bowl, a lid and a first tool. The driveshaft protrudes from the base and includes a first end proximate the base and a second end distal therefrom. The bowl is removably securable to the base. The lid is removably securable to the bowl creating a processing chamber between inner surfaces of the bowl and the lid. The first tool is rotatably securable to the driveshaft adjacent the first end in a first operating mode and is rotatably securable to the driveshaft adjacent the second end in a second operating mode. The food processor further includes a disk that is rotatably securable adjacent the second end creating a sub-processing chamber between the first surface and the inner surfaces in the second operating mode.

20 Claims, 9 Drawing Sheets

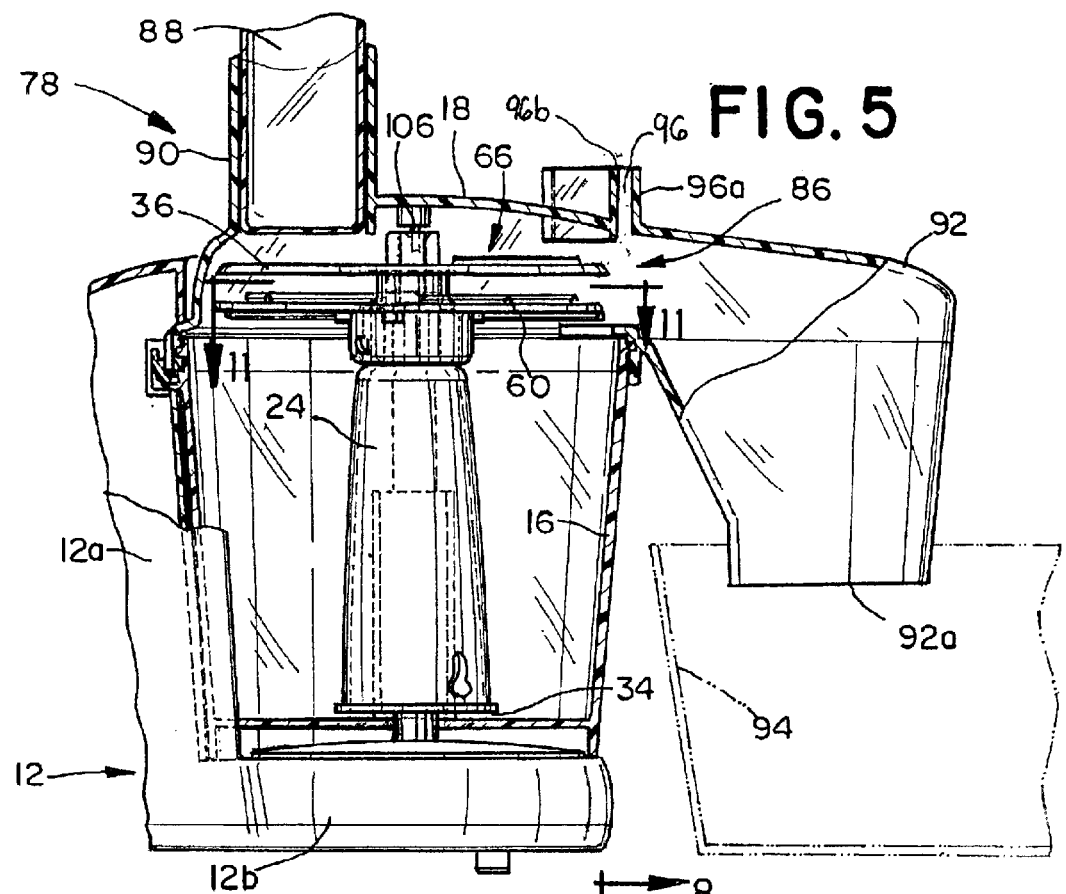
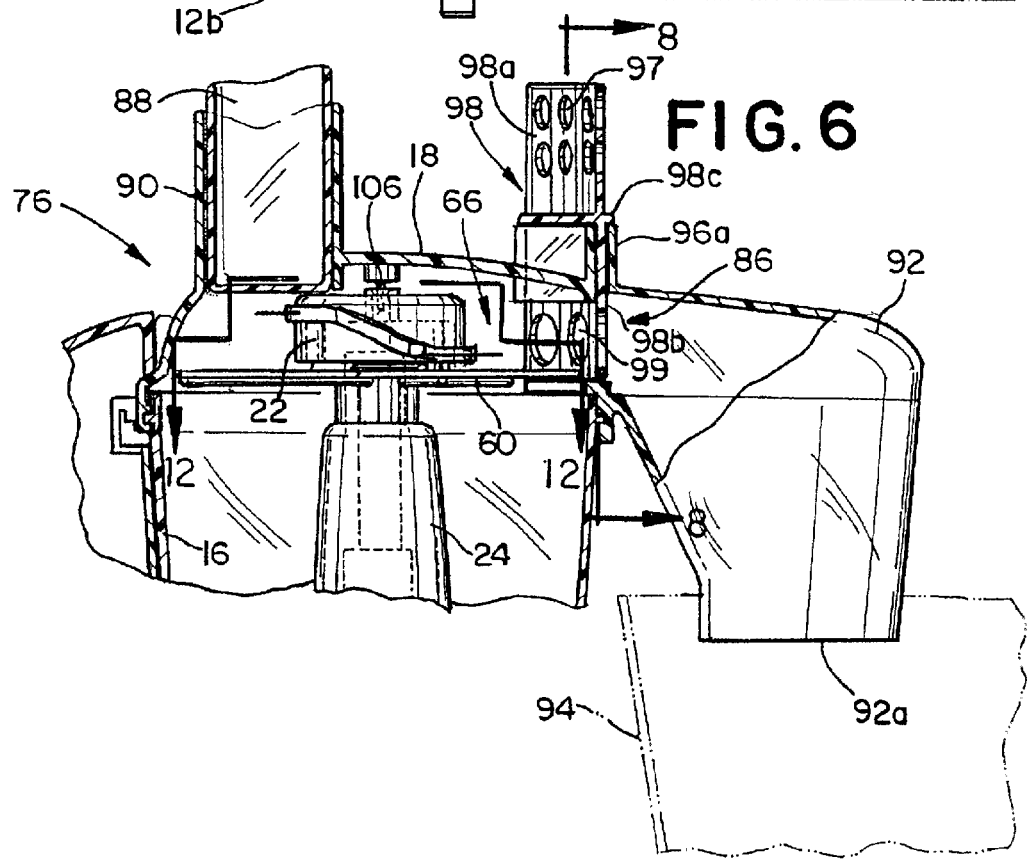

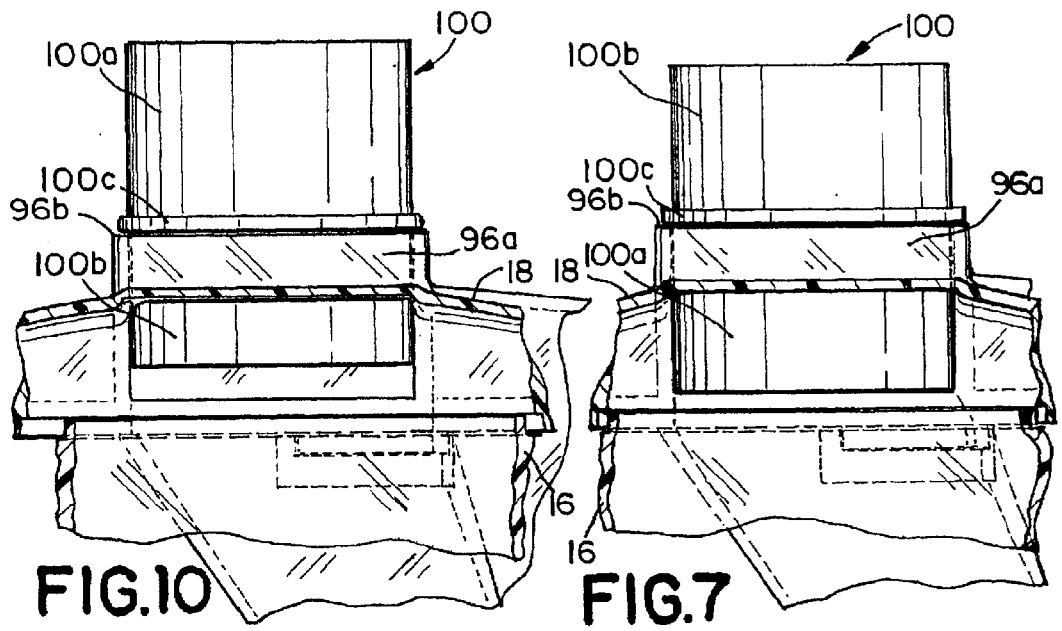
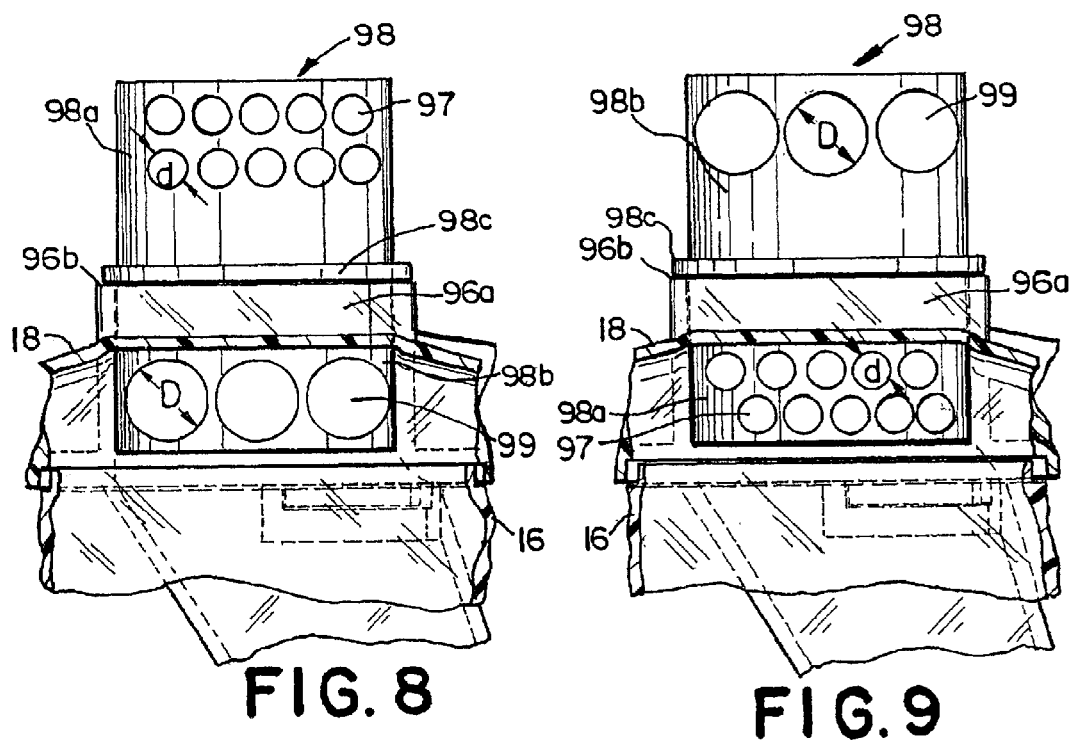

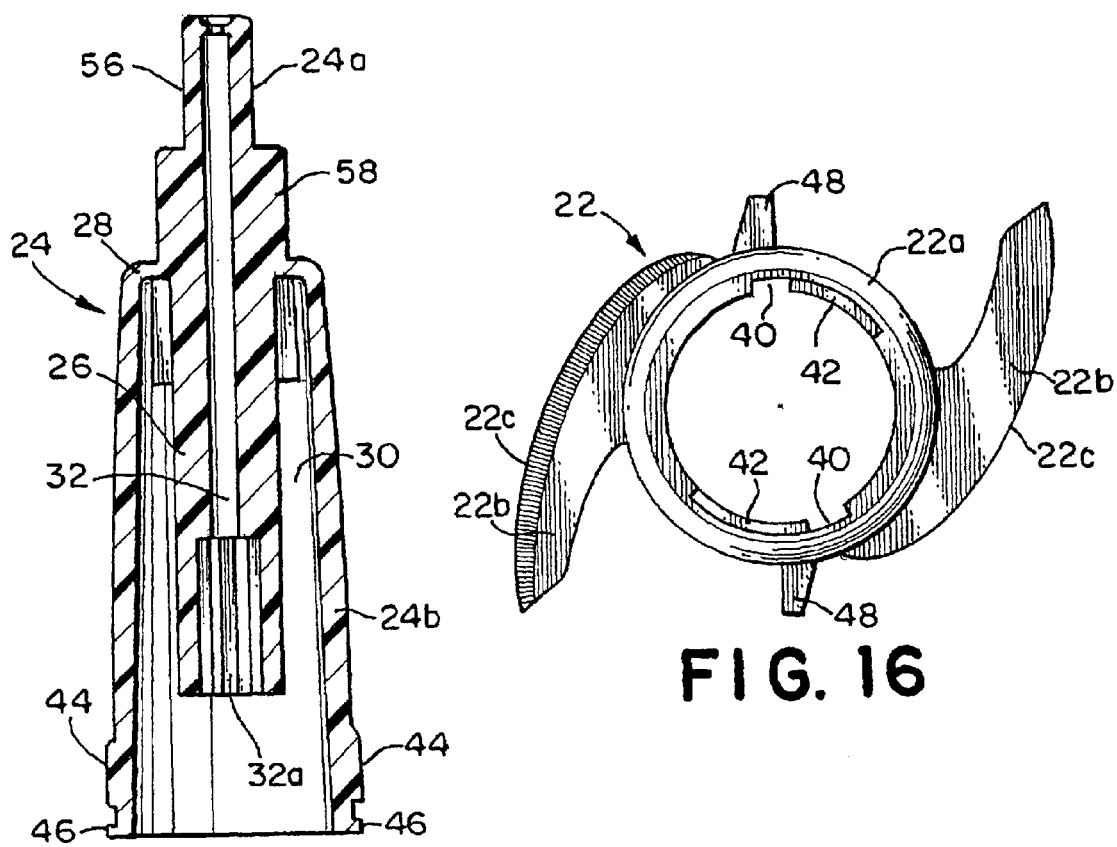
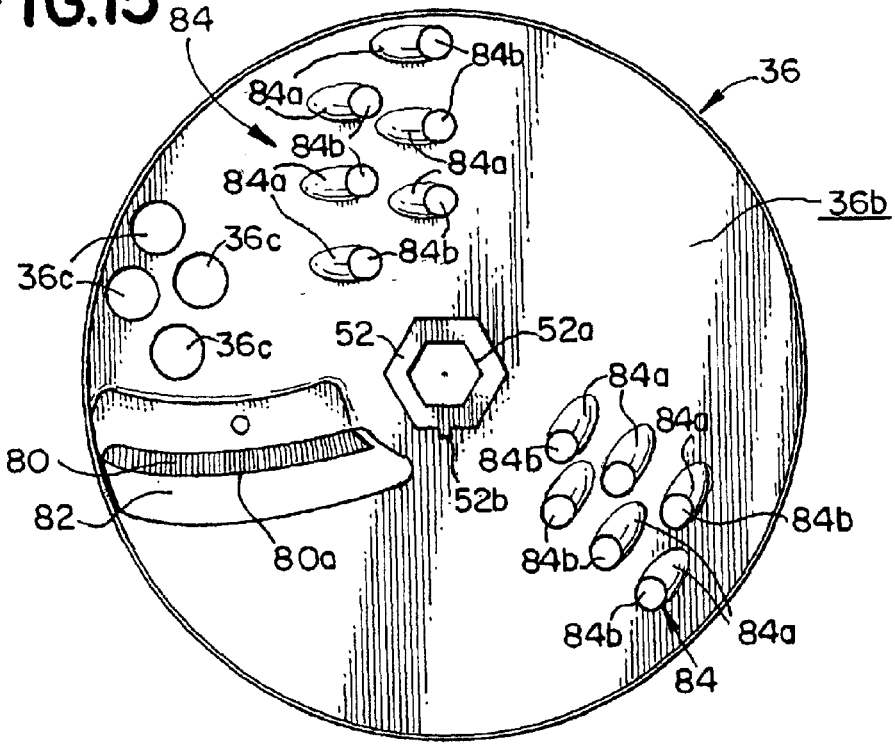
FIG. 15
FIG. 16
FIG. 17

FOOD PROCESSOR

BACKGROUND OF THE INVENTION

This invention relates to food processors and, more particularly, to a food processor including a first tool that is operational in two distinct modes at two locations on a drive shaft of the food processor. The invention also relates to continuously chopping a foodstuff using the food processor and a unique storage configuration of the food processor.

Household food processors commonly include bowls and multiple processing tools that are rotatably securable to a food processor drive shaft for processing foodstuff within the bowl. The household food processor is generally operated by securing the bowl to a base of the food processor, positioning a tool within the bowl and rotatably securing the tool to the drive shaft. Each individual tool is rotatably secured to the drive shaft in a single predetermined location. For example, a chopping tool is generally secured adjacent a base of the bowl for chopping foodstuff within the bowl while a conventional slicing disk is secured adjacent a mouth of the bowl for slicing a foodstuff that is deposited into the bowl. Chopping and slicing foodstuffs within the bowl limit a user to chopping or slicing of foodstuffs, having a volume that does not exceed the volume of the bowl. Accordingly, in order to process a large volume of foodstuffs, the bowl must be designed to have a large volume, which takes up a large amount of counterspace or a volume of foodstuff equivalent to the size of the bowl must be processed, the processed foodstuff must be removed from the bowl and additional volumes of foodstuff equivalent to the volume of the bowl must be processed until the desired volume of processed foodstuff are obtained. Therefore, to process a large amount of foodstuffs, a user must utilize a large food processor bowl that takes up a large amount of counterspace or perform a plurality of processing steps in order to obtain the desired large volume. Processing of a large volume of chopped foodstuffs with a desired size is particularly difficult using a household food processor because the conventional chopping tool is rotatably secured adjacent a base of the food processor bowl.

Further, foodstuffs to be chopped are disposed into the bowl and the chopping tool is actuated to rotate, thereby chopping the foodstuff adjacent the base of the bowl for a predetermined amount of time. Chopping in this fashion is sensitive to the amount of time the chopping tool is rotating because a foodstuff chopped for a relatively long time generally produces small chopped foodstuffs while a foodstuff that is chopped for a relatively short time generally produces large chopped foodstuffs. In addition, chopping with a conventional food processor tends to create inconsistently sized chopped foodstuffs due to inconsistent mixing of the foodstuffs being chopped.

Household food processors commonly include a plurality of tools to perform various processing operations within the food processing bowl. For example, a household food processor may include a cutting tool, chopping tool, shredding disk, slicing disk, grating wheel and dicing tool. Each of these tools may be separate from each other and are generally disposed into the food processing bowl individually for performing a particular cutting operation. In order to store the multiple tools, the conventional food processor may include a separate case for storage. Commonly, during storage or transportation, the food processor and tools become separated and tools become lost.

In view of the increasing demands for new, innovative and compact food processors for home use and the commercial food market, a food processor that is compact in size, able to perform a variety of cutting operations to simply process a relatively large volume of foodstuffs in a variety of ways and is able to store each of its operational tools within a bowl and lid is increasingly desirable. In addition, there is a specific need for a food processor that is able to chop and grade a relatively large volume of foodstuff such that the chopped foodstuff has a consistent size.

The food processor of the present invention is comparatively compact in size with respect to a conventional household food processor and includes a first tool that is rotatably securable adjacent a first end and a second end of the food processor drive shaft for processing foodstuffs in two distinct operating modes. Utilizing the first tool adjacent the first end and second end of the drive shaft, provides flexibility for a user and reduces the number of individual tools that are included with the food processor. In the first operating mode, the first tool is positioned adjacent the first end of the drive shaft to process foodstuffs within the bowl of the food processor. Alternatively, the first tool is used to continuously process foodstuffs in the second operating mode. Use of the single tool in each of the operating mode permits flexibility for a user of the food processor without increasing the number of tools that must be used and stored.

The food processor of the present invention also includes a disk that is selectively positioned within the bowl and is rotatably securable to the drive shaft of the food processor. Insertion of the disk into the bowl during operation, creates a sub-processing chamber within the bowl and lid that permits processing of foodstuff within the sub-processing chamber. A gap is positioned adjacent the sub-processing chamber and is either exposed, closed by a food gate or partially exposed by a food gate. The food processor of the present invention further includes a food guard extending from the gap that directs foodstuffs processed within the sub-processing chamber into an external container. The inclusion of the sub-processing chamber, disk, gap, food gates and food guard permits in-bowl chopping and continuous chopping of relatively large volumes of foodstuffs, using the comparatively small food processor of the present invention. Large volumes of foodstuffs may be processed because the relatively small volume of the bowl of the food processor is not used to store the processed foodstuffs. The processed foodstuffs are released through the gap to an external container for storage in the continuous modes. The use of the food processor with the in-bowl and continuous modes also provides desired flexibility for a user with a single compact device.

The food processor of the present invention further includes food gates that perform a grading operation of the chopped foodstuffs produced in a continuous chopping mode. In the continuous chopping mode, the disk is rotatably secured to the drive shaft creating the sub-processing chamber and the chopping tool is rotatably secured to the disk. The chopping tool chops foodstuffs within the sub-processing chamber when the food processor is actuated to operate. Grading food gates are positioned within the gap of the sub-processing chamber, which permit chopped foodstuffs having a predetermined size to escape from the sub-processing chamber through the gap. Chopped foodstuff having a size larger than the predetermined size are returned toward the sub-processing chamber for additional chopping.

The food processor of the present invention includes operational components including a bowl, a lid with a feed chute, a food pusher positionable within the feed chute, a gap and a slot adjacent the gap, a first food gate, a second food gate, the disk, the first tool, a second tool, and an extender. Each of the disk, gates, tools food pusher and extender are used in at least one of the first and second operating modes and are securable within the bowl and lid in a storage position. Storage of each of the operational components of the food processor reduces the likelihood that operational components will be lost during storage or transportation.

BRIEF SUMMARY OF THE INVENTION

The present invention is directed to a food processor for processing foodstuffs. The food processor includes a housing, with a motor covering and a base. A drive shaft protrudes from the base and includes a first end proximate the base and a second end distal from the base. A bowl is removably securable to the base and a lid is removably securable to the bowl. In an assembled condition, the lid creates a processing chamber between inner surfaces of the bowl and lid. A first tool is rotatably securable adjacent the first end of the drive shaft in a first operating mode and is rotatably securable adjacent the second end of the drive shaft in a second operating mode.

In another aspect, the food processor includes a housing with a motor covering and a base. A drive shaft including a first end and a second end protrudes from the base. A bowl is removably secured to the base and a lid is removably secured to the bowl enclosing a processing chamber between inner surfaces of the bowl and lid. A disk including a first surface is rotatably securable adjacent the second end of the drive shaft, creating a sub-processing chamber between the first surface of the disk and the inner surfaces of the bowl and lid. In a continuous operating mode, the first tool may be positioned within the sub-processing chamber for operational association and rotation with the drive shaft for chopping foodstuffs within the sub-processing chamber.

In another aspect, the food processor includes a housing with a motor covering and a base. A drive shaft protrudes from the base and a lid including a feed chute is removably securable to the bowl. A lid, which includes a feed chute is removably securable to the bowl creating a food processing chamber between inner surfaces of the bowl and lid. A food pusher is slideably positionable within the feed chute. A gap including a slot adjacent the gap is located in a side surface of at least one of the bowl and lid. At least a first food gate and a second food gate are slideably positionable within the slot. The disk is rotatably secured to the drive shaft and the food processor includes at least the first tool, a second tool and an extender having an upper end and a lower end. The extender is rotatably securable to the drive shaft to rotate therewith. The disk, gates, tools, food pusher and extender are used in at least one of a first and second operating modes of the food processor and may be secured within the bowl and lid in a storage position.

In yet another aspect, the food processor includes a housing with a motor covering and a base. A drive shaft protrudes from the base and a bowl is removably securable to the base. A lid is removably securable to the bowl creating a processing chamber between inner surfaces of the bowl and lid. A gap is positioned in a peripheral surface of the processing chamber and a slot is positioned adjacent the gap. A first food gate includes first and second ends and is positionable within the slot to selectively cover and expose the gap. The first and second ends of the first food gate permit chopped foodstuffs having predetermined sizes to exit the processing chamber when the first food gate covers the gap.

BRIEF DESCRIPTION OF THE SEVERAL VIEWS OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment that is presently preferred. It should be understood, however, that the invention is not limited to the precise arrangements and instrumentalities shown.

In the drawings:

FIG. 5 is a partial, front cross-sectional view of the food processor shown in FIG. 1, taken along line X—X of FIG. 1, configured in a continuous slicing/shredding mode;

FIG. 6 is a partial, front cross-sectional view of the food processor shown in FIG. 1, taken along line X—X of FIG. 1, configured in a continuous chopping mode;

FIG. 7 is a partial, cross-sectional view of the food processor shown in FIG. 4, taken along line 7—7 of FIG. 4, showing the second food gate positioned in the slot completely covering the gap;

FIG. 8 is a partial, cross-sectional view of the food processor shown in FIG. 6, taken along line 8—8 of FIG. 6, showing the coarse lattice of the first food gate position in the gap;

FIG. 9 is a partial, cross-sectional view of the food processor shown in FIG. 6, taken along line 8—8 of FIG. 6, showing the fine lattice of the first food gate position in the gap;

FIG. 10 is a partial, cross-sectional view of the food processor shown in FIG. 6, taken along line 8—8 of FIG. 6, showing the second food gate positioned in the slot partially exposing the gap;

FIG. 15 is an enlarged cross-sectional view of the extender of the food processor shown in FIG. 2, taken along line 15—15 of FIG. 2;

FIG. 16 is an enlarged top plan view of the first tool of the food processor shown in FIG. 2;

FIG. 17 is an enlarged top plan view of the second tool of the food processor shown in FIG. 2;

DETAILED DESCRIPTION OF THE INVENTION

Figure 1:
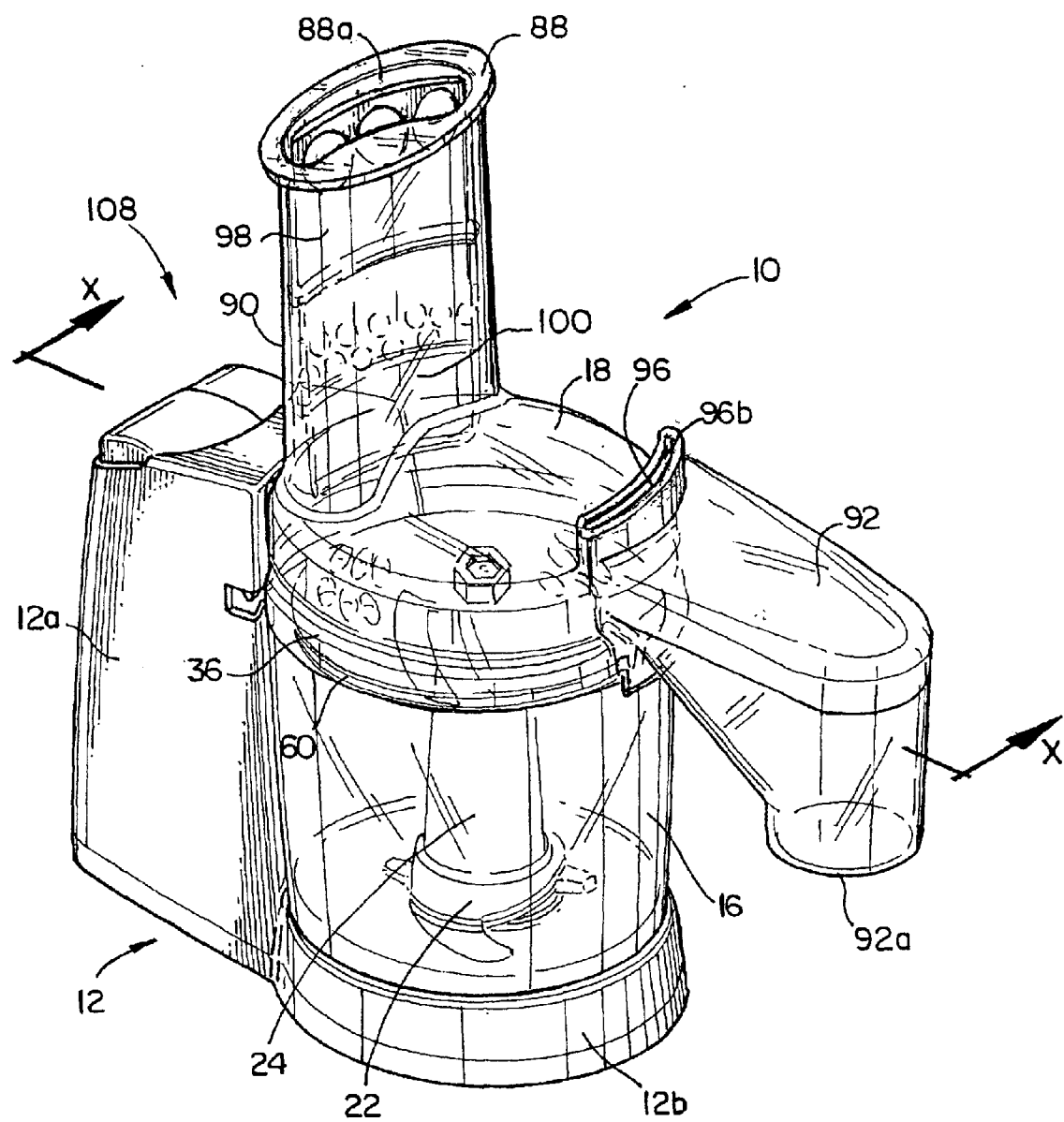
FIG. 1 is a left-side perspective view of a food processor in a storage position, in accordance with a preferred embodiment of the present invention.

Certain terminology is used in the following description for convenience only and is not limiting. The words "right", "left", "lower" and "upper" designate directions in the drawings to which reference is made. The words "inwardly" and "outwardly" refer to directions toward and away from, respectively, the geometric center of the food processor and designated parts thereof. The terminology includes the words above specifically mentioned, derivatives thereof and words of similar import.

Figure 2:
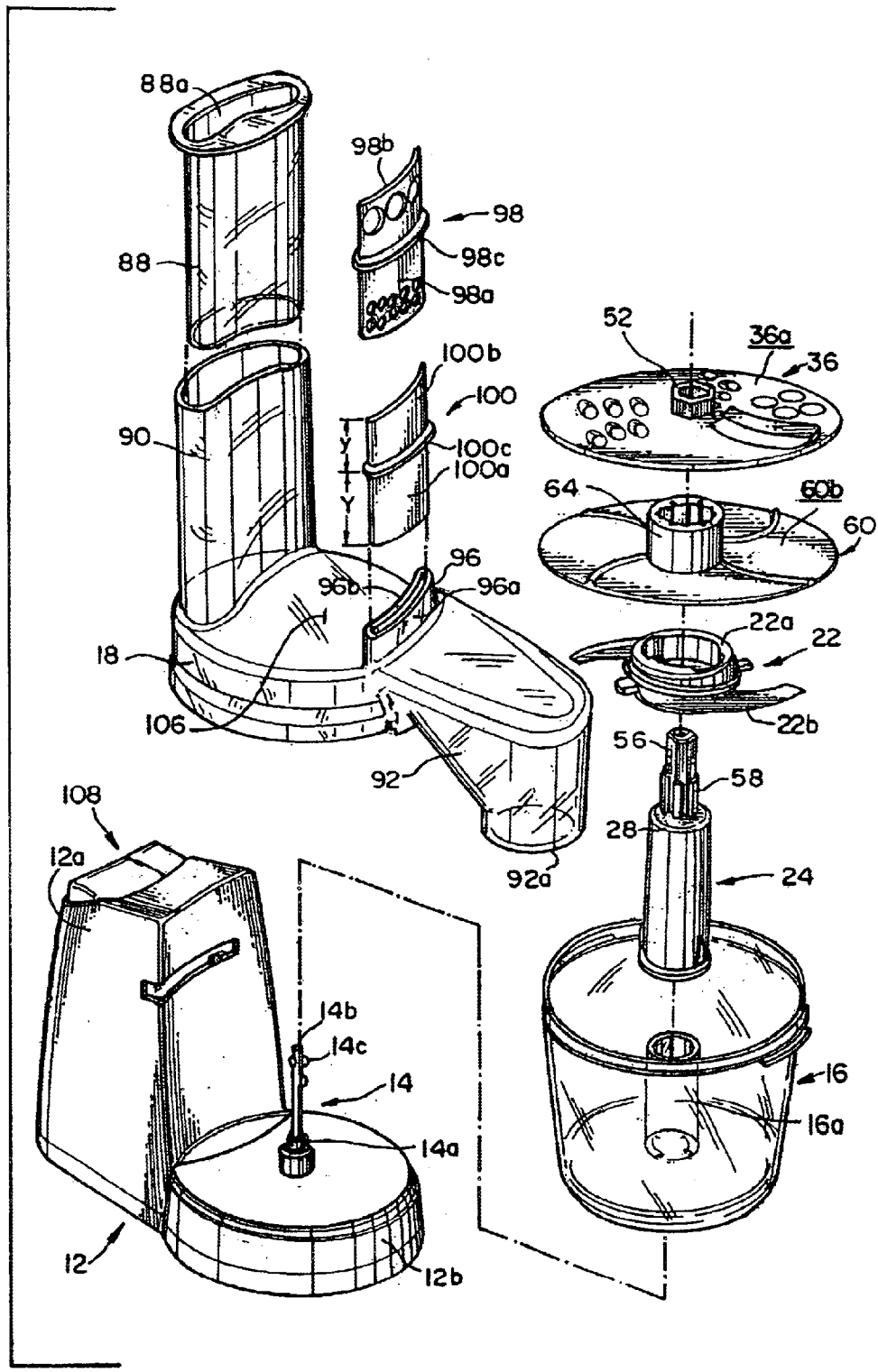
FIG. 2 is an exploded view of the operational components of the food processor shown in FIG. 1.

Referring to the drawings in detail, wherein like numerals indicate like elements throughout, there is shown in FIGS. 1 and 2, a preferred embodiment of a food processor, generally designated 10, in accordance with the present invention.

Referring to FIGS. 1 and 2, in the preferred embodiment, the food processor 10 includes a housing 12 having a motor covering 12a and a base 12b. A drive shaft 14 protrudes from the base 12b and includes a first end 14a proximate the base 12b and a second end 14b distal from the base 12b. The drive shaft 14 protrudes through a penetration (not shown) in the base 12b and is rotatably driven by a motor (not shown) positioned within the motor covering 12a. A bowl 16 is removably securable to the base 12b through any number of securing measures that are well known in the art, such as a bayonet-type securing arrangement. The bowl 16 includes a generally cylindrical sleeve 16a extending from a lower surface of the bowl 16 generally in the center thereof, which accommodates the drive shaft 14 in an assembled position. A lid 18 is removably securable to the bowl 16 creating a processing chamber 20 (see FIGS. 3 and 4) between inner surfaces of the bowl 16 and lid 18 in the assembled position. The lid 18 is secured to the bowl 16 using any number of securing measures that are well known in the art.

Referring to FIGS. 1–3 and 6, a first tool 22 is rotatably securable to the drive shaft 14 adjacent the first end 14a in a first operating mode and is also rotatably securable to the drive shaft 14 adjacent the second end 14b in a second operating mode as described in more detail hereinafter. In the preferred embodiment, the food processor 10 further includes an extender 24 having an upper end 24a and a lower end 24b. The extender 24 is rotatably positionable and securable between the first tool 22 and the drive shaft 14 to rotate as the drive shaft 14 rotates, thereby causing the first tool 22 to rotate when the first tool 22 is secured to the extender 24.

Referring to FIGS. 2 and 15, in the preferred embodiment, the extender 24 is comprised of an internal sleeve 26 and an external shell 28 with a cylindrical space 30 formed between the internal sleeve 26 and external shell 28. In an operating position, the second end 14b of the drive shaft 14 is inserted into a bore 32 in the internal sleeve 26. Also in the operating position, the internal sleeve 26 is positioned within the sleeve 16a of the bowl 16 and the sleeve 16a of the bowl 16 is positioned within the cylindrical space 30 of the extender 24. Protrusions 14c positioned at the second end 14b of the drive shaft 14 engage longitudinal grooves 32a within the bore 32 of the internal sleeve 26 to rotatably couple the extender 24 to the drive shaft 14. One having ordinary skill in the art will realize that the coupling between the drive shaft 14 and extender 24 is not limited to the protrusions 14c and longitudinal grooves 32a as described above. The extender 24 may be rotatably coupled to the drive shaft 14 through nearly any connection means that permits releasable, rotational coupling of the extender 24 to the drive shaft 14 and are well known in the art. For example, the extender 24 may employ conventional fasteners or spring-loaded pins that rotatably couple the extender 24 to the drive shaft 14.

Figure 4:
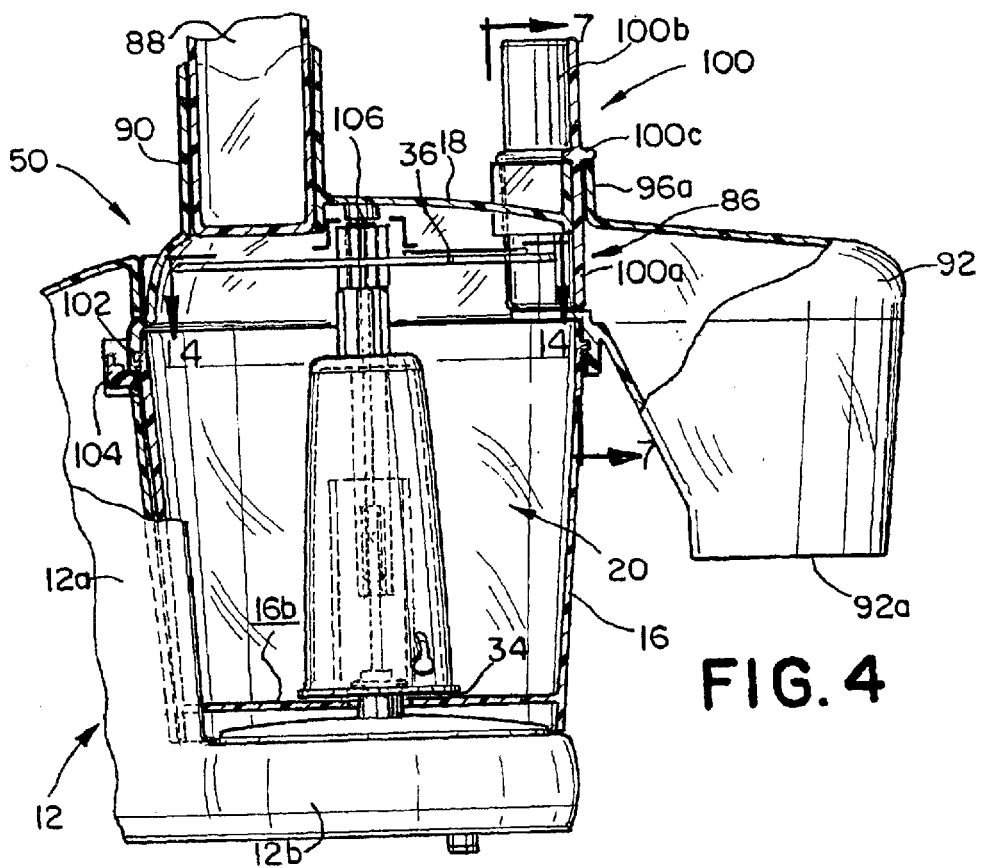
FIG. 4 is a partial, front cross-sectional view of the food processor shown in FIG. 1, taken along line X—X of FIG. 1, configured in an in-bowl slicing/shredding mode.
Figure 11:
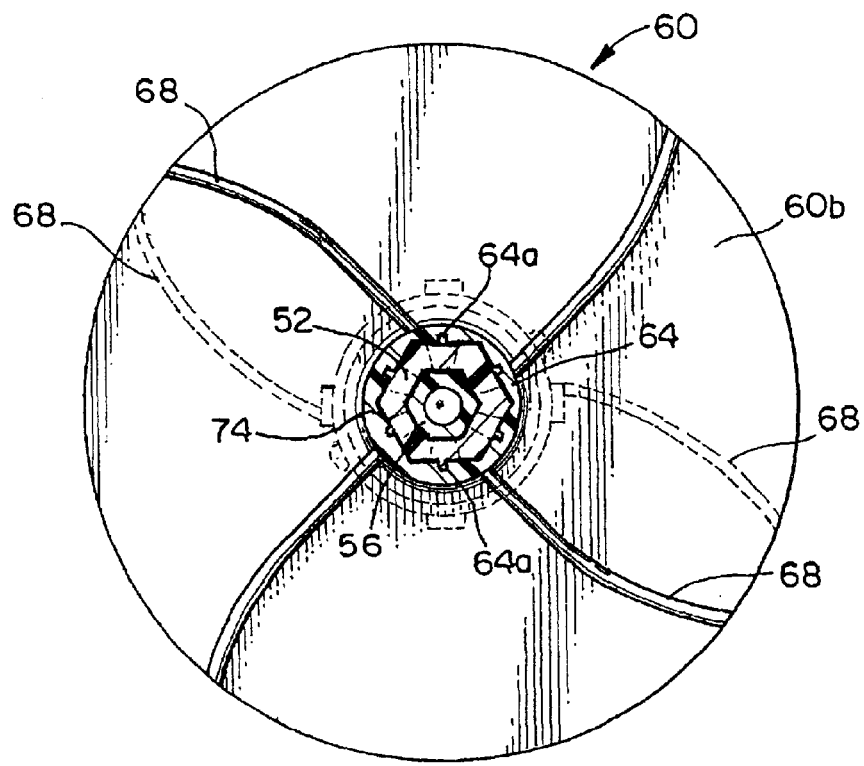
FIG. 11 is an enlarged partial cross-sectional view of the food processor shown in FIG. 5, taken along line 11—11 of FIG. 5, showing the disk and a hub of the second tool secured to an upper end of the extender.
Figure 12:
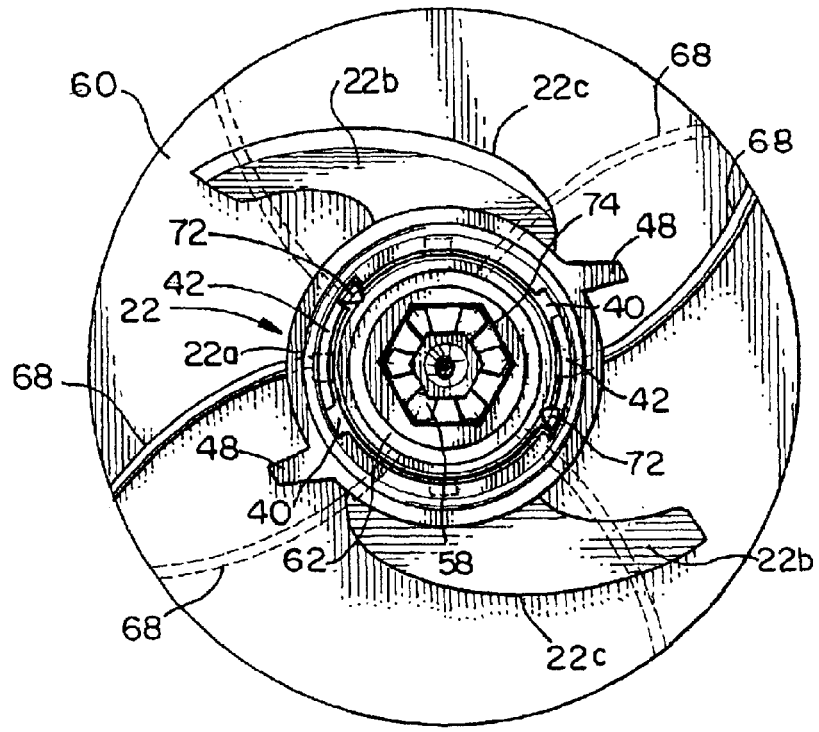
FIG. 12 is an enlarged partial, cross-sectional view of the food processor shown in FIG. 6, taken along line 12—12 of FIG. 6, showing the disk and first tool secured to the extender at the upper end of the extender.
Figure 13:
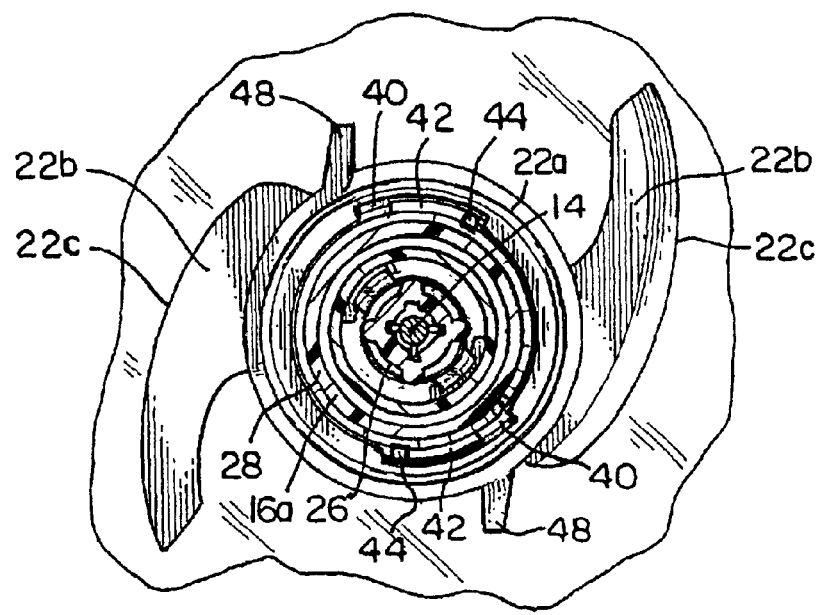
FIG. 13 is an enlarged partial, cross-sectional view of the food processor shown in FIG. 3, taken along line 13—13 of FIG. 3, showing the first tool secured to the lower end of the extender.

Referring to FIGS. 2, 4 and 15, in the preferred embodiment, the positioning of the extender 24 relative to the base 12b is controlled by the length of the longitudinal grooves 32a of the extender 24 and the positioning of the protrusions 14c of the drive shaft 14. In the operating position, the second end 14b of the drive shaft 14 slides into the bore 32 until one of the protrusions 14c contacts an end of one of the longitudinal grooves 32a. The protrusions 14c and longitudinal grooves 32a are configured such that the lower end 24b of the extender 24 does not contact a base surface 16b of the bowl 16 in an operational position. Accordingly, a small space 34 is formed between the lower end 24b of the extender 24 and the base surface 16b of the bowl 16. In the preferred embodiment, the space 34 is approximately one to one and one-half millimeters. The space 34 between the lower end 24b of the extender 24 and the base surface 16b of the bowl 16 permits free rotational movement of the extender 24 without impinging upon or wearing the base surface 16b. The space 34 between the lower end 24b of the extender 24 and the base surface 16b of the bowl 16 is generally small in order to inhibit foodstuffs from entering the cylindrical space 30. In addition, the sleeve 16a of the bowl 16 extends upwardly into the cylindrical space 30 further inhibiting food within the bowl 16 from escaping from the bowl 16 if it reaches the cylindrical space 30. The above-described configuration of the extender 24 and the bowl 16 is not limiting in that the extender 24 and bowl 16 may be configured in any manner that permits the extender 24 to rotate relative to the bowl 16 and generally inhibits foodstuffs from entering the cylindrical space 30 or escaping from the bowl 16.

Figure 3:
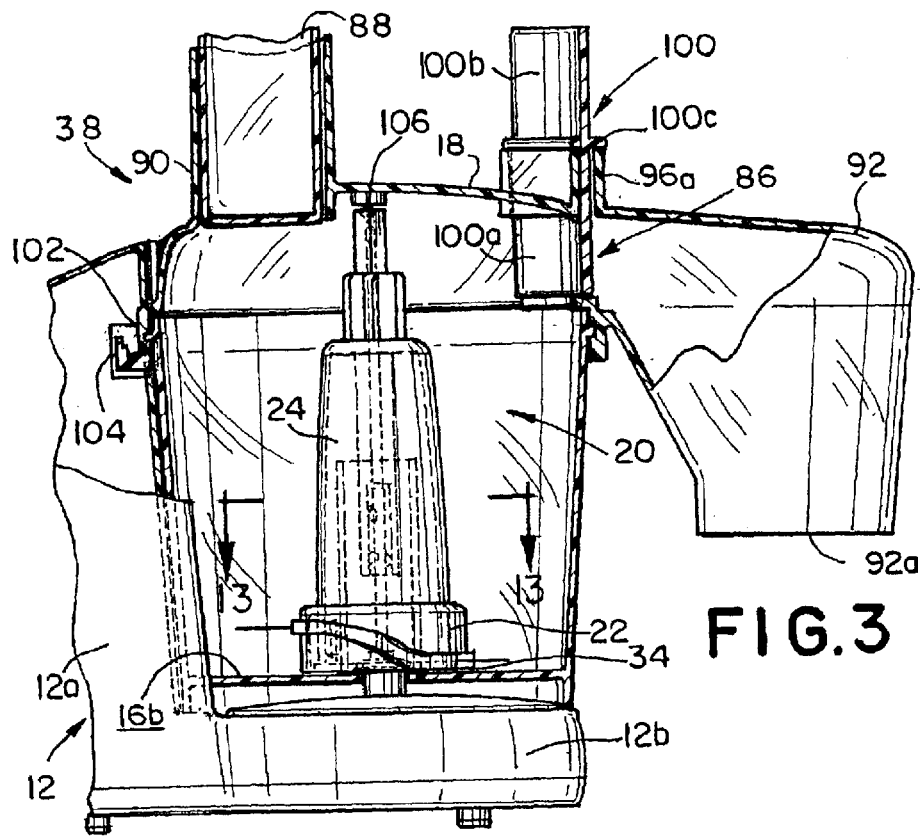
FIG. 3 is a partial, front cross-sectional view of the food processor shown in FIG. 1, taken along line X—X of FIG. 1, configured in an in-bowl chopping mode.

Referring to FIGS. 3 and 4, in the first operating mode, at least one of the first tool 22 is rotatably engaged with the lower end 24b of the extender 24 and a second tool 36 is rotatably engaged with the upper end 24a of the extender 24 in the processing chamber 20. In the preferred embodiment, the first operating mode is an in-bowl-processing mode.

Referring to FIG. 3, in a first in-bowl-processing mode 38, the first tool 22 is rotatably engaged with the lower end 24b of the extender 24. The first tool 22 is preferably rotatably secured to the extender 24 using a bayonet-type attachment, however, the rotatable attachment of the first tool 22 to the extender 24 is not limited to a bayonet-type attachment and may be comprised of a fastener (not shown) that secures the first tool 22 to the extender 24, a spring loaded rod (not shown) that rotatably secures the first tool 22 to the extender 24 or any securing means that releasably, rotatably secures the first tool 22 to the extender 24.

Referring to FIGS. 15 and 16, in the preferred embodiment of the first in-bowl processing mode 38, a generally annular, central disk 22a of the first tool 22 is complementarily positioned about the external shell 28 of the extender 24 such that the first tool 22 slides to a position on the extender 24 adjacent the lower end 24b. In the preferred embodiment, the first tool 22 is comprised of an S-blade disk including the disk 22a and a pair of sickle-shaped blades 22b. The disk 22a includes slots 40 on an inner surface that open into a ledge 42 and diametrically opposed operating handles 48 radially extending from an external surface of the disk 22a. The extender 24 includes a pair of diametrically opposed tabs 44 radially extending from the lower end 24b and a circumferentially extending lip 46 at the lower end 24b. To rotatably engage the first tool 22 with the extender 24 the tabs 44 slide through the slots 40 such that the lip 46 engages a lower surface of the disk 22a. When the tabs 44 are inserted into the slots 40, the first tool 22 is rotated such that the tabs 44 slide along and engage a terminal end of the ledge 42, thereby rotatably coupling the extender 24 to the first tool 22. The rotational movement of the first tool 22 relative to the extender 24 may be introduced by grasping and applying pressure to the operating handles 48 in a counterclockwise direction as shown in FIG. 16.

Conversely, to disengage the first tool 22 from the extender 24, the first tool 22 is rotated such that the tabs 44 of the extender 24 slide along the ledge 42 until they are aligned with the slots 40 of the first tool 22. When the tabs 44 are aligned with the slots 40, the first tool 22 may be moved in a direction away from the lip 46 and along the external shell 28, until the disk 22a is completely disengaged from the extender 24. The above-described rotational connection of the first tool 22 relative to the extender 24 is not limiting and may be comprised of any securing means that rotatably secures the first tool 22 relative to the extender 24. In addition, it is preferred that the first tool 22 be used to chop foodstuffs positioned within the bowl 16 in the first in-bowl processing mode 38. However, the first tool 22 is not limited to chopping operations in the first in-bowl processing mode 38 and may blend, pulverize or cut foodstuffs positioned within the bowl 16 and processing chamber 20.

Referring to FIG. 4, in a second in-bowl-processing mode 50, the second tool 36 is rotatably engaged with the upper end 24a of the extender 24. In the preferred embodiment, the second in-bowl-processing mode 50 is a processing mode in which foodstuffs are sliced or shredded and deposited into the bowl 16 by the second tool 36, which is comprised of a slicer/shredder disk. The second in-bowl processing mode 50 is not limited to slicing and shredding operations but may be comprised of any food processing operation that permits processing of a foodstuff inserted into the bowl 16 using the second tool 36 positioned at the upper end 24a of the extender 24.

Referring to FIGS. 15 and 17–19, in the second in-bowl-processing mode 50, the second tool 36 or slicer/shredder disk 36 includes a slicing surface 36a and an opposing shredding surface 36b. The second tool 36 further includes a shaft 52 positioned generally centrally on the second tool 36 that protrudes from both the slicing surface 36a and shredding surface 36b. The shaft 52 includes a centrally located hexagonal bore 52a and a key 52b extending longitudinally along an external side of the shaft 52. The second tool 36 also includes a peripheral wall 54 that extends from a peripheral edge of the second tool 36 away from the slicing surface 36a. The peripheral wall 54 provides out of plane stiffness and stability to the second tool 36. It is also preferred that the upper end 24a of the extender 24 include a first hexagonal stop 56 sized to receive the hexagonal bore 52a and a second hexagonal stop 58. In the second in-bowl processing mode 50, the second tool 36 is rotatably engaged with the upper end 24a by sliding the hexagonal bore 52a of the shaft 52 over the first hexagonal stop 56. The first hexagonal stop 56 slides into and engages the hexagonal bore 52a such that the second tool 36 is rotatably engaged with the extender 24. In the operating position, the shaft 52 of the second tool 36 is in facing engagement with an upper surface of the second hexagonal stop 58, preventing movement of the second tool 36 toward the lip 46 of the extender 24 beyond the first hexagonal stop 56. It is preferred that the second tool 36 be reversible such that the hexagonal bore 52a may engage the first hexagonal stop 56 regardless of whether the slicing surface 36a or shredding surface 36b is facing toward the lip 46 of the extender 24. Therefore, the second tool 36 is adaptable for use as a slicing and shredding tool depending upon which surface of the second tool 36 is facing the lid 18, as described in more detail hereinafter. One having ordinary skill in the art will realize that the second tool 36 is not limited to a slicing surface 36a and a shredding surface 36b. The second tool 36 may be comprised of essentially any tool that may be rotatably engaged with the upper end 24a of the extender 24 for processing foods in the second in-bowl-processing mode 50. For example, the second tool 36 may be comprised of a grating wheel or a knife blade that grates, slices, dices or cuts foodstuffs introduced into the processing chamber 20.

Referring to FIGS. 2, 5, 6, 11, 12, 20 and 21, in the preferred embodiment, the food processor further includes a disk 60. The disk 60 includes a first hub 62 that protrudes from a first disk surface 60a and a second hub 64 that protrudes from a second disk surface 60b opposite the first disk surface 60a and first hub 62. In a second operating mode, at least one of the first and second hubs 62, 64 are rotatably engageable with the upper end 24a of the extender 24, creating a sub-processing chamber 66 between at least one of the first and second disk surfaces 60a, 60b and the inner surfaces of the lid 18. In a preferred arrangement of the second operating mode, the sub-processing chamber 66 is utilized to process foodstuffs in a continuous processing mode.

Figure 20:
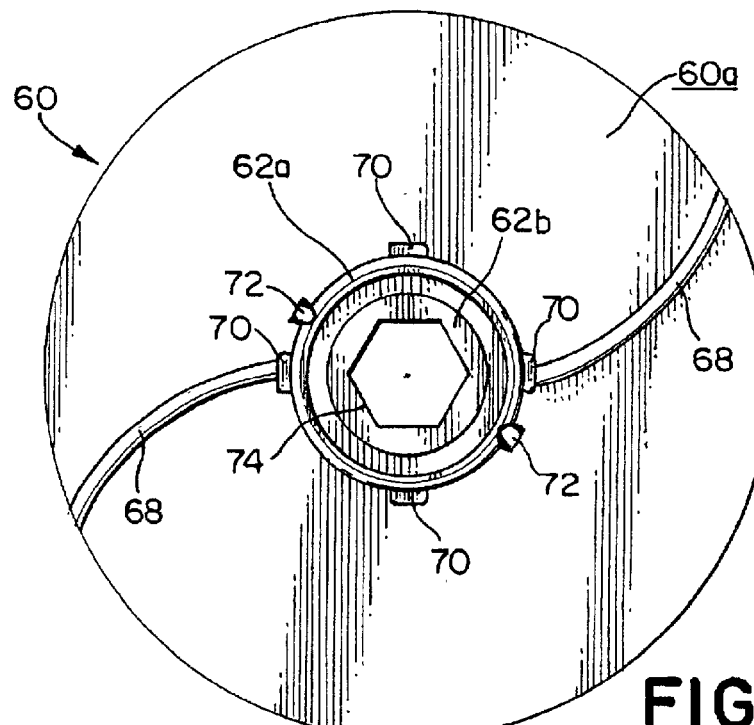
FIG. 20 is an enlarged top plan view of the disk of the food processor shown in FIG. 2.
Figure 21:
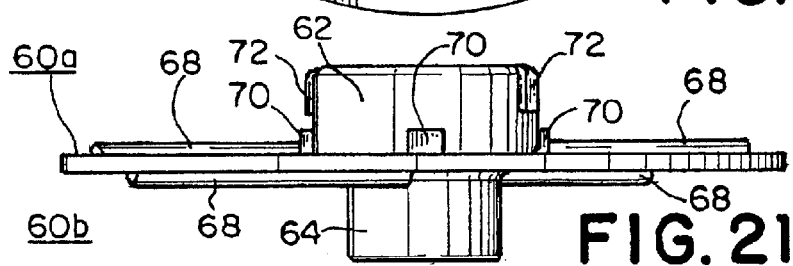
FIG. 21 is a side view of the disk of the food processor shown in FIG. 2.

Referring specifically to FIGS. 20 and 21, the disk 60 preferably includes two generally equidistantly spaced arcuate ribs 68 that are raised from the first disk surface 60a and four generally equidistantly spaced arcuate ribs 68 that are raised from the second disk surface 60b. The two ribs 68 on the first disk surface 60a accommodate securing of the first tool 22 or S-blade disk 22 to the disk 60 while the four ribs 68 accommodate securing of the second tool 36 as is described in more detail below. The ribs 68 are designed to urge foodstuffs that come into contact with the ribs 68 during rotation of the disk 60 in the direction of rotation and toward a periphery of the disk 60. The disk 60 is not limited to configurations including two ribs 68 on the first disk surface 60a and four ribs 68 on the second disk surface 60b. The disk 60 may include nearly any number of ribs 68 on the first and second disk surfaces 60a, 60b, no ribs 68 at all or a generally uneven surface that promoted urging of the processed foodstuffs toward a periphery of the disk 60 during rotation.

Referring to FIGS. 20 and 21, the first hub 62 of the disk 60 includes an outer, generally cylindrical ring 62a and an inner, generally cylindrical inner ring 62b with a centrally located hexagonal bore 74. In the preferred embodiment, the hexagonal bore 74 extends through both of the first and second hubs 62, 64. The outer ring 62a includes a plurality of legs 70 extending radially from an outer surface adjacent the first disk surface 60a and a pair of locking tabs 72 extending radially from the outer surface adjacent an end of the outer ring 62a opposite the first disk surface 60a. The second hub 64 also includes a plurality of rail channels 64a that extend along a surface of the hexagonal bore 74 from an end of the second hub 64 opposite the second disk surface 60b to a predetermined location that does not reach an intersection of a plane defined by the second disk surface 60*b* intersecting the second hub 64.

Referring to FIGS. 2, 5, 6, 12, 16, 20 and 21, in the preferred embodiment of the second operating mode, at least one of the first tool 22 is rotatably engaged with the first hub 62 and the second tool 36 is rotatably engaged with the second hub 64 within the sub-processing chamber 66. In a first continuous operating mode 76, the first tool 22 or the S-blade disk 22 is rotatably engaged with the disk 60 through the first hub 62. The disk 60 and first hub 62 rotatably engage the first tool 22 in much the same manner as the extender 24 rotatably engages the first tool 22, as is described above. Specifically, in the first continuous operating mode 76, the first tool 22 is positioned on the disk 60 about the first hub 62 such that the locking tabs 72 are positioned adjacent to and aligned with the slots 40. The locking tabs 72 of the disk 60 slide into the slots 40 until the locking tabs 72 are clear of the ledge 42 and an upper surface of the legs 70 contact a lower surface of the disk 22*a*. The legs 70 provide clearance between the first disk surface 60*a* and the blades 22*b* of the first tool 22 or S-blade disk 22, which reduces the likelihood that foodstuffs will become lodged between the blades 22*b* and first disk surface 60*a*. In addition, the ribs 68 of the first disk surface 60*a* are preferably positioned such that they are not positioned beneath the blades 22*b* when the first tool 22 or S-blade disk 22 is secured to the disk 60 in an operating position (see FIG. 12). Positioning of the ribs 68 of the first disk surface 60*a* beneath the blades 22*b* may cause foodstuffs to become jammed between the blades 22*b* and the ribs 68, which is not preferred. Upon being aligned with the first hub 62, the first tool 22 is rotated such that the locking tabs 72 travel along and engage the ledge 42, thereby rotatably securing the first tool 22 relative to the first hub 62 and disk 60. One of ordinary skill in the art will realize from this disclosure that the present invention is not limited to a bayonet-type rotational engagement between the first tool 22 and disk 60. The rotational engagement between the first tool 22 and disk 60 may be of any type that rotatably secures the disk 60 and first tool 22 relative to each other.

Referring to FIGS. 6, 12, 15, 16 and 19–21, in the first continuous operating mode 76, the rotatably engaged disk 60 and first tool 22 are disposed onto the extender 24 such that the extender 24 is rotatably engaged with the disk 60. The disk 60 is rotatably engaged with the upper end 24 of the extender 24 in the first continuous operating mode 76 by sliding the hexagonal bore 74 over the second hexagonal stop 58 of the extender 24 with the second hub 64 facing the lip 46. In this preferred arrangement, the engagement of the hexagonal bore 74 and hexagonal stop 58 rotatably engage the disk 60 to the extender 24. The vertical positioning of the disk 60 relative to the extender 24 is controlled by contact between the second hub 64 and the top of the outer shell 28 of the extender 24. Similar to the previously described rotatable attachments, the present invention is not limited to rotatable attachment of the disk 60 to the extender 24 and may be comprised of nearly any rotatable attachment that is known by one having ordinary skill in the art.

Referring to FIGS. 5, 11, 14, 17, 18, 20 and 21, in a second continuous operating mode 78 of the preferred embodiment, the second tool 36 is rotatably engaged with the second hub 64 of the disk 60 within the sub-processing chamber 66. The second tool 36 is rotatably engaged with the disk 60 by positioning the shaft 52 inside the hexagonal bore 74 formed within the second hub 64 such that the hexagonal shape of the shaft 52 complementarily engages the hexagonal bore 74 of the second hub 64. When the hexagonal shapes of the shaft 52 and hexagonal bore 74 are engaged, the key 52*b* of the shaft 52 also engages one of the rail channels 64*a* of the second hub 64, thereby rotatably securing the second tool 36 to the disk 60. The key 52*b* not only aids in rotatably coupling the shaft 52 to the second hub 64 but prevents the shaft 52 from being inserted into the hexagonal bore 74 of the first hub 62. Accordingly, the disk 60 may not be rotatably coupled to the second tool 36 at the first hub 62 adjacent the first disk surface 60*a*. In addition, in the second continuous operating mode 78, the first hexagonal stop 56 of the upper end 24*a* of the extender 24 engages the hexagonal bore 52*a* of the shaft 52 and the hexagonal bore 74 of the disk 60 complementarily engages the second hexagonal stop 58 of the extender 24. Accordingly, through the engagement of the key 52*b* and one of the rail channels 64*a*, hexagonally-shaped shaft 52 and hexagonal bore 74, hexagonal bore 52*a* and first hexagonal stop 56 and hexagonal bore 74 and second hexagonal stop 58, the second tool 36, disk 60 and extender 24 are each rotatably engaged relative to each other. In the second continuous operating mode 78, the second tool 36 processes foodstuffs within the sub-processing chamber 66. One having ordinary skill in the art will realize that the rotational engagement between the second tool 36, disk 60 and extender 24 is not limited to the above-described structure or configuration. The second tool 36, disk 60 and extender 24 may be rotationally engaged using any engagement means that permits rotational engagement between the second tool 36, disk 60 and extender 24.

Referring to FIGS. 5, 11, 14, and 17–21, in the second continuous operating mode 78, the second tool 36 may be rotatably secured to the upper end 24*a* of the extender 24 and to the disk 60 such that either the first face 36*a* or the second face 36*b* is facing the second disk surface 60*b*. In the preferred embodiment, the second tool 36 is comprised of a slicer/shredder disk 36 for slicing foodstuffs using the first face 36*a* and shredding foodstuffs using the second face 36*b*. Accordingly, using the single rotational engagement method including the hexagonal shaft 52 with the key 52*b*, second hub 64 with the rail channels 64*a* and hexagonal bore 74 and the first hexagonal stop 56 of the extender 24, the second tool 36 provides food processing flexibility by permitting multiple food processing operations depending upon whether the first face 36*a* or second face 36*b* is facing the second disk surface 60*b*.

In the preferred embodiment, the first face 36*a* of the second tool or slicer/shredder disk 36 includes a knife blade 80 extending from the first face 36*a* having a sharpened leading edge 80*a*. In addition, a slicing hole 82, penetrating the second tool 36, is positioned adjacent the leading edge 80 to accommodate the travel of sliced foodstuffs through the slicing hole 82 upon slicing by the knife blade 80. In the first configuration of the second continuous operating mode 78, foodstuffs that are sliced by the leading edge 80*a*, fall through the slicing hole 82 onto the first disk surface 60*a* and are urged toward a periphery of the sub-processing chamber 66 by the ribs 68.

Figure 14:
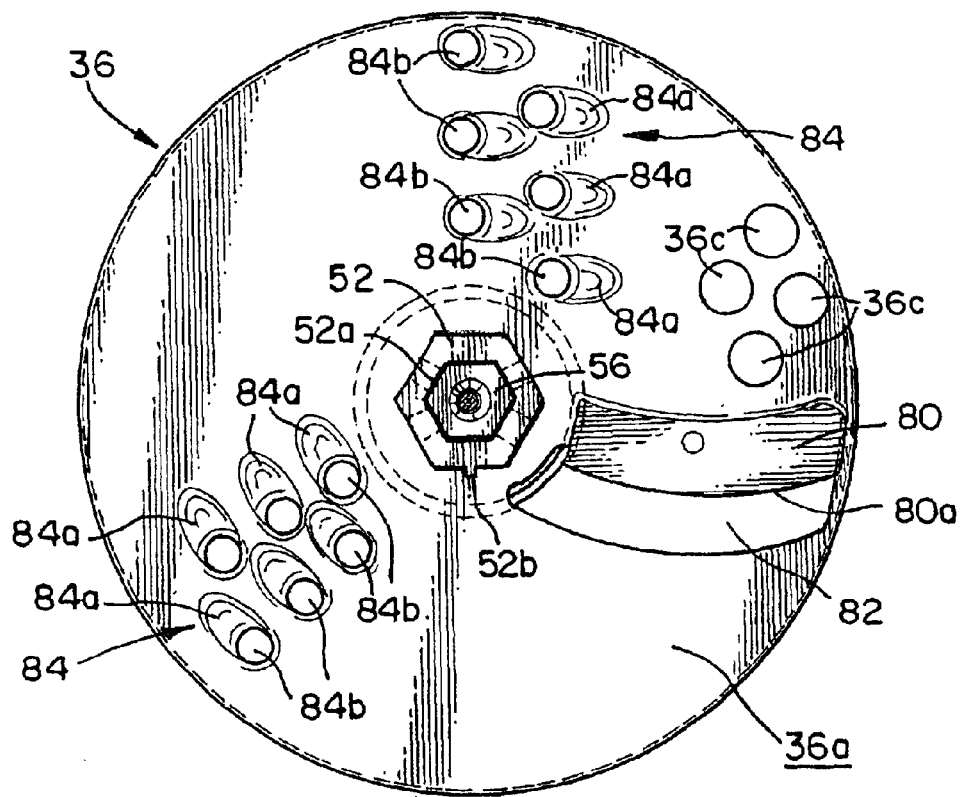
FIG. 14 is an enlarged partial, cross-sectional view of the food processor shown in FIG. 4, taken along line 14—14 of FIG. 4, showing the second tool secured to the upper end of the extender.

Referring to FIGS. 14 and 17, the second tool or slicer/shredder disk 36 further includes shredding penetrations 84 protruding from the second face 36*b*. When the second tool 36 is positioned in the second continuous operating mode 78 such that the second face 36*b* is facing away from the second disk surface 60*b*, the second tool 36 may be utilized as a shredding tool. The shredding penetrations 84 include domed portions 84*a* that permit shredding of a foodstuff that is introduced onto the second face 36*b*. The domed portions 84*a* engage and shred a foodstuff introduced onto the second face 36b when the second tool 36 is rotating, which is then fed through the shredding holes 84b and onto the second disk surface 60b. The second tool or slicer/shredder disk 36 also includes balancing holes 36c positioned adjacent the knife blade 80. The balancing holes 36c offset the weight of the knife blade 80 to aid in balancing the weight of the slicer/shredder disk 36 such that its center of gravity is positioned approximately at the center of the disk 36. One skilled in the art will realize from the above-description that the second tool 36 or slicer/shredder disk 36 is not limited to slicing and shredding operations. For example, the first or second faces 36a, 36b of the second tool 36 may be designed to grate foodstuffs that are introduced onto one of the first or second faces 36a, 36b.

Referring to FIGS. 6, 12, 15, 16 and 19–21, in the first continuous operating mode 76, the S-blade cassette 22 is rotatably secured to the disk 60 and the upper end 24a of the extender 24 within the sub-processing chamber 66. Foodstuffs introduced into the sub-processing chamber 66 are chopped by the S-blade cassette 22 when the extender 24, disk 60 and S-blade cassette 22 rotate. The foodstuffs are chopped by the rotating cutting edges 22c of the blades 22b.

Referring to FIGS. 3–6, in the preferred embodiment, the food processor 10 includes a gap 86 in the lid and/or the bowl 16 adjacent the sub-processing chamber 66. Referring specifically to FIGS. 3 and 4, in the first operating mode including the first in-bowl processing mode 38 and second in-bowl processing mode 50, the gap 86 is closed and the food processor 10 processes foodstuffs within the processing chamber 20. Conversely, referring specifically to FIGS. 5 and 6, in the second operating mode, including the first continuous operating mode 76 and the second continuous operating mode 78, the gap 86 is at least partially exposed, wherein the food processor 10 operates to continuously process foodstuffs for release from the sub-processing chamber 66 through the gap 86.

In the preferred embodiment, as shown in FIGS. 3–5 and 7–10, the gap 86 is formed in a side of the lid 18. The food processor 10 may be configured having the gap 86 positioned nearly anywhere on a surface of the lid 18 or the bowl 16. For example, the gap 86 may be formed as a combination cut-out between a side of the lid 18 and the bowl 16 or may be comprised of a penetration exclusively within a side of the bowl 16. In such a configuration, the extender 24 may be reconfigured such that the disk 60 is positioned closer to the base 12b than shown in the attached figures, such that foodstuffs propelled by the disk 60 toward inner surfaces of the bowl 16 and lid 18 would be projected toward the gap 86 in the side of the bowl 16.

Referring to FIGS. 1–6, it is preferred that the food processor 10 further include a food pusher 88. In addition, it is preferred that the lid 18 include a feed chute 90 and a food guard 92 extending from a peripheral side of the lid 18 adjacent the gap 86 and in alignment therewith. The food pusher 88 is removably positionable and slidable within the feed chute 90 to urge foodstuffs positioned within the feed chute 90 into the processing chamber 20 or sub-processing chamber 66. The food guard 92 includes a mouth 92a for the dispersion of food from the sub-processing chamber 66. The food guard 92 extends from the side of the lid 18 adjacent the gap 86 and permits foodstuffs within the sub-processing chamber 66 to escape the sub-processing chamber 66 through the gap 86 into the food guard 92 and out of the mouth 92a. The operation of the food processor 10 does not require the inclusion of a food pusher 88, feed chute 90 and food guard 92. However, the food pusher 88 and feed chute 90 are generally well-known preferred functional and safety accessories of food processors.

Referring to FIGS. 5 and 6, in the preferred embodiment, when using the food processor 10 in the second operating mode, including the first continuous operating mode 76 and the second continuous operating mode 78, foodstuffs are introduced into the sub-processing chamber 66 through the feed chute 90. The foodstuffs are processed within the sub-processing chamber 66 by the first tool 22 or the second tool 36 and the processed foodstuffs are released from the gap 86 into the food guard 92. The processed foodstuffs introduced into the food guard 92 are directed by the food guard 92 into a container 94 positioned adjacent the mouth 92a. The use of the food pusher 88, feed chute 90, gap 86 and food guard 92 permit a user to continuously process foodstuffs within the sub-processing chamber 66 and release the processed foodstuffs into the external container 94. Accordingly, if a user is processing a large amount of foodstuffs, the bowl 16 and lid 18 do not need to be removed from the base 12b when the bowl 16 becomes full of processed foodstuffs. The bowl 16 and lid 18 do not need to be removed from the base 12b because the processed foodstuffs are not disposed into the bowl 16 but escape from the sub-processing chamber 66 through the gap 86 into an external bowl 94, which may be removed and replaced by an additional external bowl 94 or may have a holding capacity that is much greater than the holding capacity of the bowl 16.

Inclusion of the food guard 92 into the food processor 10 is utilized to control the flow of processed foodstuffs from the sub-processing chamber 66 into the external container 94, however, the use of a food guard 92 is not limiting. For example, a channeling system may be devised that does not extend externally from the sub-processing chamber 66 but is internal to the sub-processing chamber 66 and controls the flow of processed foodstuffs from the sub-processing chamber 66 into the external container 94. In addition, the food processor 10 may be designed such that a container 94 is secured directly to either the lid 18 or the bowl 16 adjacent the gap 86 to capture food directly in the container 94 as the processed foodstuffs exit the gap 86.

Referring to FIG. 6, in the first continuous operating mode 76, foodstuffs introduced into the sub-processing chamber 66 are chopped by the first tool 22. As mentioned above, it is preferred that the first tool 22 be comprised of the S-blade disk 22 for chopping foodstuffs when being used in the first continuous operating mode 76. However, the first tool 22 may be comprised of any tool that is able to chop foodstuffs introduced into the sub-processing chamber 66 during operation in the first continuous operating mode 76. For example, the first tool 22 may be comprised of a tool having any number of chopping blades that chop foodstuffs introduced into the sub-processing chamber 66. Chopping foodstuffs in the sub-processing chamber 66 using the first continuous operating mode 76 is convenient for chopping relatively large amounts of foodstuffs. For example, chopping large quantities of crackers for breading, nuts for a topping, or a vegetable for a sauce.

Referring to FIGS. 1, 2 and 5–10, when used in the first continuous operating mode 76, the food processor 10, includes the gap 86, as described above, which permits release of the chopped foodstuffs from the sub-processing chamber 66. Preferably a slot 96 is positioned adjacent the gap 86 and a first food gate 98 or second food gate 100 is slidable within the slot 96 for alternatively covering, opening and partially exposing the gap 86. In the preferred embodiment of the first continuous operating mode 76, the first food gate 98 includes a first end 98a with a fine lattice and a second end 98b with a course lattice. The first end 98a with the fine lattice permits a predetermined size of chopped foodstuff to be released from the gap 86 and the second end 98b with the course lattice permits a larger sized chopped foodstuff to be released from the gap 86. In addition, in the preferred embodiment of the first continuous operating mode 76, the second food gate 100 includes a first side 100a and a second side 100b. The second side 100b has a length y from a central cap 100c to an edge of the second side 100b that is shorter than a length Y of the first side 100a from the central cap 100c to an edge of the first side 100a (see FIG. 1). When inserted in the slot 96 in the first continuous operating mode 76, the second side 100b permits chopped foodstuffs to be released from the gap 86 while the first side 100a is not utilized in the first continuous operating mode 76.

Referring to FIGS. 1–3 and 7–10, the slot 96 is preferably formed by a pair of vertical walls 96a that are integral with and extend from the lid 18 adjacent the food guard 92 to a terminal end 96b. In the preferred embodiment, to position one of the food gates 98, 100 within the slot 96, one of the ends 98a, 98b, 100a, 100b of the food gates 98, 100 is positioned within the slot 96 until a central support 98c or central cap 100c of the food gates 98, 100 is resting on the terminal end 96b. The positioning of the ends 98a, 98b, 100a, 100b in the slot 96 and relative to the gap 86 is controlled by the length of the ends 98a, 98b, 100a, 100b, the location of the terminal end 96b and the size of the gap 86.

Referring to FIGS. 8–10, in the preferred embodiment of the first continuous operating mode 76, the fine lattice is comprised of circular holes 97 in the first end 98a having a predetermined fine lattice diameter d and the course lattice is comprised of circular holes 99 through the second end 98b having a predetermined course lattice diameter D. In this configuration, when the first end 98a is positioned within the slot 96 only chopped foodstuffs having a cross section that may pass through the fine lattice diameter d is able to escape through the gap 86. Alternatively, when the second end 98b is positioned within the slot 96, the course lattice diameter D permits only chopped foodstuffs having a cross sectional size that may pass through the course lattice diameter D to be released from the gap 86. Further, when the second end 100b of the second food gate 100 is positioned in the slot 96, the gap 86 is partially covered and only chopped foodstuffs having a size smaller than an exposed section of the gap 86 may exit the sub-processing chamber 66. In the preferred embodiment, the fine lattice diameter d is approximately four to eleven millimeters and the coarse lattice diameter D is approximately twelve to twenty-two millimeters. The fine and course lattice located on the first and second ends 98a, 98b of the first food gate 98 are not limited to generally circular holes 97, 99 through the ends 98a, 98b of the food gate 98. For example, the fine and course lattice of the first and second ends 98a, 98b may be comprised of generally square holes or longitudinal slits, as long as the first end 98a permits only smaller foodstuffs to exit the gap 86 than the second end 98b. The fine and course lattice of the first and second ends 98a, 98b are designed to control the grade of the chopped foodstuffs that are released from the gap 86 when the food processor 10 is operating in the first continuous operating mode 76.

Referring to FIG. 1, in a storage position, the food processor 10 is designed to retain each of its individual operational components within the boundaries of the food processor 10. The individual components retained by the food processor 10 in the storage position include at least the housing 12, drive shaft 14, bowl 16, lid 18, food pusher 88, first food gate 98, second food gate 100, disk 60, first tool 22, second tool 36 and extender 24. Each of the disk 60, first and second food gates 98, 100, first and second tools 22, 36, food pusher 88 and extender 24 are used in at least one of the first and second operating modes of the food processor 12 and are secured within the bowl 16 and lid 18 in the storage position. Permitting the storage of each of the above-listed operational components within the bowl 16 and lid 18 in the storage position is convenient in that individual operational components are generally not lost during storage. Accordingly, when the food processor 10 is stored with each of its operational components in the above-described storage position, the individual operational components are each retained together in a single location and are unlikely to be lost or misplaced.

In the preferred storage positions, the bowl 16 is secured to the base 12b, the lid 18 is secured to the bowl 16, the extender 24 is secured to the drive shaft 14, the first tool 22 is secured to the lower end 24b of the extender 24, the disk 60 is secured adjacent the upper end 24a of the extender 24, the second tool 36 is secured adjacent the upper end 24a and the first and second food gates 98, 100 are positioned within a central void 88a of the food pusher 88. Alternatively, the extender 24 is secured to the drive shaft 14, the first tool 22 is secured to the lower end 24b, the disk 60 is secured adjacent the upper end 24a, the second tool 36 is secured adjacent the upper end 24a, the lid 18 is secured to the bowl 16, the bowl 16 is secured to the base 12b and the first and second food gates 98, 100 are positioned within the bowl 16 in the storage position (not shown). The above-listed storage positions are not meant to be limiting but are examples of the preferred embodiments of the storage positions of the food processor 10. The storage positions are designed to retain each of the operational components of the food processor 10 within the boundaries of the bowl 16 and lid 18 to limit loss of the operational components and result in decreased storage space.

Referring to FIGS. 8–10, in the preferred embodiment of the first continuous operating mode 76, the first food gate 98 is slidable within the slot 96 and includes at least a first position, a second position and a third position. In the first position, the first food gate 98 is removed from the slot 96 and the gap 86 is exposed. A chopped foodstuff having a size that is as large as the gap 86 may be released from the gap 86 when the first food gate 98 is positioned in the first position. In the second position, the first food gate 98 or latticed food gate 98 is positioned such that the first end 98a is within the slot 96 where the central support 96c rests on the terminal end 96b and the fine lattice covers the gap 86. A first predetermined size of chopped foodstuff is released from the gap 86 when the first food gate 98 is positioned in the second position. In the third position, the second end 98b with the central support 96c resting on the terminal end 96b is positioned within the gap 86 such that the coarse lattice covers the gap 86. A second predetermined size of chopped foodstuff is released from the gap 86 when the first good gate 98 is positioned in the third position. The second predetermined size of chopped foodstuffs is larger than the first predetermined size of chopped foodstuffs as is described above. In addition, in the preferred embodiment of the first continuous operating mode 76, the second side 100b of the second food gate 100 is positioned in the slot 96 where the central cap 100c rests on the terminal end 96 and the gap 86 is partially exposed. A third predetermined size of chopped foodstuff is released from the gap 86 when the second side 100b of the second food gate 100 is positioned in the slot 96.

Referring to FIGS. 3, 4 and 7, in the preferred embodiment, the food processor 10 also includes the second food gate 100 that, as was briefly described above, includes the first side 100*a*, second side 100*b* and central cap 100*c*. In the first operating mode, including the first and second in-bowl processing modes 38, 50, the first side 100*a* is positioned within the slot 96 with the central cap 100*c* resting on the terminal end 96*b*, which completely covers the gap 86. The length Y of first side 100*a* of the second food gate 100 is long enough to extend from a top of the slot 96 to a bottom of the slot 96, thereby covering and closing the gap 86. Accordingly, in the first and second in-bowl processing modes 38, 50 of the first operating mode, foodstuffs are not able to exit the processing chamber 20 during operation of the food processor 10 because the first side 100*a* is covering the gap 86. The food processor 10 is not limited to configurations including the second food gate 100 that slides into the slot 96 and covers the gap 86 as shown in FIG. 7. For example, the food processor 10 may include a food gate that is integral with and slidable relative to a side of the lid 18, which slides from one side of the gap 86 to an opposite side of the gap 86 to selectively cover a portion of the gap 86 or to completely cover the gap 86.

Referring to FIGS. 6 and 10, in the first continuous operating mode 76, as was briefly described above, the second side 100*b* of the second food gate 100 is positioned within the slot 96 such that the gap 86 is partially exposed and the central cap 100*c* is resting on the terminal end 96*b*. The length y of the second side 100*b* extends from the central cap 100*c* to an end of the second side 100*b* and is less than the first side length Y. Accordingly, when the second side 100*b* is positioned within the slot 96, the gap 86 is partially exposed. The second side 100*b* is positioned within the slot 96 in the first continuous operating mode 76 such that chopped foodstuffs may exit the sub-processing chamber 66 through the partially exposed gap 86. The second side length y may have any dimension that permits stable positioning of the second food gate 100 relative to the lid 18 when the second side 100*b* is positioned within the slot 96 but has a length that is less than the first side length Y. The second side 100*b* length y permits chopped foodstuffs to be released from the sub-processing chamber 66 having a chopped cross section that is less than the size of the partially exposed gap 86. The second food gate 100 is not limited to configurations including the second side 100*b* having the second side length y. For example, a sliding door may be positioned on the lid 18 that moves from a position adjacent a top of the gap 86 toward the bowl 16 to partially cover the gap 86 and vary the exposed area of the gap 86.

Referring to FIGS. 1 and 2, it is preferred that the housing 12, bowl 16, lid 18, extender 24, disk 60, shaft 52 of the second tool 36, disk 22*a* of the fist tool 22 and first and second food gates 98, 100 are constructed from a rigid, structural polymeric material that is able to withstand the normal operating conditions of the above-described components. The above-listed components are not limited to polymeric materials and may be comprised of any material that is formable into the general shaped of the components and is able to withstand the normal operating conditions of the food processor 10. It is also preferred that the above-listed components are manufactured using a polymeric material processing technique, for example injection molding, that produces the general shape of the components as described above and shown in the attached figures. However, the above-listed components are not limited to polymeric material constructions and may be constructed from a variety of light-weight, easily formable metallic materials of any material that may take on the shape and perform the function of the above-listed components. Further, it is preferred that the slicer/shredder disk 36 except for the shaft 52 and the blades 22*b* of the S-blade disk 22 are constructed from a rigid sheet metal material that is able to structurally withstand in the cutting operations of the first and second tools 22,36. Preferably the disk 36 except for the shaft 52 and the blades 22*b* are manufactured using common sheet metal forming processes that are generally well known in the art. However, the disk 36 except for the shaft 52 and the blades 22*b* are not limited to sheet metal constructions and may be manufactured from a plurality of materials, for example, a rigid polymeric material, that is able to be formed into the shape of the above-listed components and withstand normal operating conditions.

In operation, the food processor 10 may be employed to process foodstuffs within the bowl 16 in the first operating mode or may be employed to continuously process foodstuffs in the second operating mode. The use of the single food processor 10 to process foodstuffs within the bowl 16 and to continuously process foodstuffs using the first and second operating modes provides flexibility for a user.

Referring to FIGS. 3 and 4, in the first operating mode, the food processor 10 may be employed in the first in-bowl-processing mode 38 or in the second in-bowl-processing mode 50. In each of the in-bowl processing modes 38, 50, the bowl 16 is secured to the base 12*b* in a manner that is well known in the art, the lid 18 is secured to the bowl 16 such that a safety tab 102 of the lid 18 engages a safety switch 104 within the motor covering 12*a*, as is also well known in the art, and the first side 100*a* of the second food gate 100 is positioned within the slot 96 to close the gap 86 as described above. In both of the in-bowl processing modes 38, 50, it is preferred that the extender 24 is engaged by a pin 106 extending from an internal surface of the lid 18 into the bore 32 (see FIGS. 3 and 19). The engagement of the extender 24 by the pin 106 provides added stability to the assembly.

Referring to FIG. 3, in the first in-bowl-processing mode 38, the first tool 22 is rotatably secured to the lower end 24*b* of the extender 24 as described above. Foodstuffs are either disposed into the bowl 16 prior to engaging the lid 18 with the bowl 16 or are inserted into the bowl 16 through the feed chute 90 after securing the lid 18 to the bowl 16. The food processor 10 is then actuated to operate by depressing one of the control buttons 108 positioned on a surface of the motor covering 12*a*. Actuation of the food processor 10 by one of the control buttons 108 causes the drive shaft 14, extender 24 and first tool 22 to rotate, thereby processing the foodstuffs that are positioned within the bowl 16. In the preferred embodiment, the first tool 22 is comprised of the S-blade cassette that chops foodstuffs positioned within the bowl 16. The processed foodstuffs remain in the bowl 16 and are unable to escape through the gap 86 because of the positioning of the second food gate 100 covering the gap 86, the small size of the space 34 and the bowl sleeve 16*a*. When the foodstuffs have been processed for a predetermined amount of time, a user removes the lid 18 from the bowl 16 and removes the extender 24 and first tool 22 from the drive shaft 14 and bowl 16. The processed foodstuffs may then be poured from the bowl 16 for use.

Figure 18:
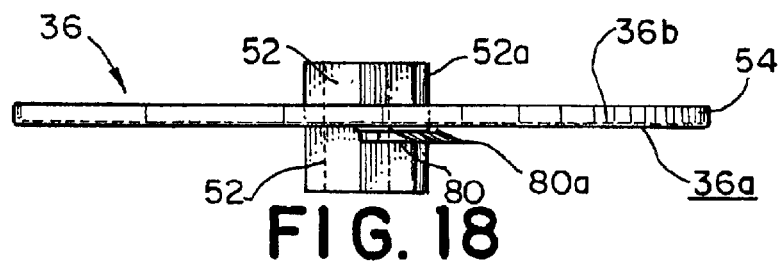
FIG. 18 is a side view of the second tool of the food processor shown in FIG. 17.
Figure 19:
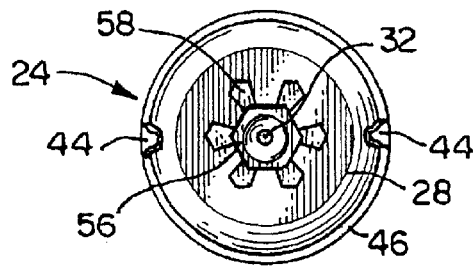
FIG. 19 is an enlarged top plan view of the extender of the food processor shown in FIG. 2.

Referring to FIGS. 4, 17 and 18, in the second in-bowl processing mode 50, the extender 24 is configured for operation in the first operating mode by securing the second tool 36 to the upper end 24*a* of the extender 24 as described above. In the second in-bowl-processing mode 50, foodstuffs are introduced into the processing chamber 20 through the feed chute 90 and onto either of the first or second faces 36*a*, 36*b* of the second tool 36. The food processor 10 is actuated to operate by depressing one of the control buttons 108, which causes the drive shaft 14, extender 24 and second tool 36 to rotate. Rotation of the second tool 36 causes the foodstuffs positioned on one of the first and second faces 36a and 36b to be processed by the second tool 36. The foodstuffs may be urged onto either the first or second faces 36a and 36b by pressing on the foodstuff located within the feed chute with the food pusher 88. In the preferred embodiment, the second tool 36 is comprised of the slicer/shredder disk that slices foodstuffs when the first face 36a is facing the feed chute 90 and shreds foodstuffs when the second face 36b is facing the feed chute 90. Foodstuffs processed by the second tool 36 in the second in-bowl processing mode fall from the second processing tool 36 into the bowl 16. When a predetermined amount of foodstuffs have been processed or the bowl 16 becomes full, the lid 18 is removed from the bowl 16 and the extender 24 and second tool 36 are removed from the bowl 16. The processed foodstuffs within the bowl 16 may then be poured from the bowl 16 or utilized by an operator.

Referring to FIGS. 5 and 6, in the second operating mode, the bowl 16 is secured to the base 12b, the lid 18 is secured to the bowl 16 such that the safety tab 102 engages the safety switch 104, the extender 24 is secured within the bowl 16 to the drive shaft 14 and the disk 60 is secured to the upper end 24a of the extender 24 as described above. In addition, the container 94 is positioned below the mouth 92a of the food guard 92 to capture food expelled from the gap 86 into the food guard 92. The second operating mode permits continuous processing of foodstuffs and release of the processed foodstuffs from the sub-processing chamber 66 into the external container 94, which may have a greater capacity than the bowl 16 or may permit the use of multiple external containers 94 to permit continuous processing of the foodstuffs. The positioning of the disk 60 on the extender 24 in the second operating mode, creates the sub-processing chamber 66 between a surface of the disk 60 and inner surfaces of the lid 18 and bowl 16. A periphery of the disk 60 relative to the internal surfaces of the bowl 16 has a generally small tolerance, thereby, preferably not permitting foodstuffs or processed foodstuffs to escape from the sub-processing chamber 66 into the bowl 16. In the preferred embodiment, the periphery of the disk 60 is positioned approximately one-half to two millimeters from the internal surfaces of the bowl 16. Eliminating contact between foodstuffs or processed foodstuffs and the bowl 16 or a major portion of the bowl 16 outside of the sub-processing chamber 66 reduces the cleaning that must be completed when processing of foodstuffs is completed and permits continuous processing of foodstuffs without the need to empty the bowl 16 during processing.

Referring to FIGS. 6, 8–10 and 12, in the first continuous operating mode 76, the first tool or S-blade disk 22 is secured to the disk 60 which is secured to the upper end 24a of the extender 24, as described above. In addition, either the first or second ends 98a, 98b of the first food gate 98, the second side 100b of the second food gate 100 or neither of the first nor second food gates 98a, 98b is positioned within the slot 96, as described above. Foodstuffs are introduced directly into the sub-processing chamber 66 or through the feed chute 90 into the sub-processing chamber 66 and rest upon the first disk surface 60a. The food processor 10 is actuated to operate by depressing one of the control buttons 108, thereby causing the driveshaft 14, extender 24, disk 60 and first tool 22 to rotate. Rotation of the first tool 22 causes the foodstuffs positioned upon the first disk surface 60a to be processed or chopped using the cutting edges 22c of the blades 22. The processed or chopped foodstuffs are urged by the ribs 68 toward a periphery of the sub-processing chamber 66 where the processed foodstuffs eventually impinge upon a periphery of the sub-processing chamber 66 adjacent the gap 86. Foodstuffs that are small enough to escape through one of the gap 86, the course or fine lattice of the first or second ends 98a, 98b or the partially exposed gap 86 beneath the second end 100b are propelled into the food guard 92 through the gap 86 and out of the mouth 92a into the container 94. Additional foodstuffs for chopping may be urged into the sub-processing chamber 66 through the feed chute 90 while the blades 22 are rotating. Continuous chopping of foodstuffs within the sub-processing chamber 66 and grading of the chopped foodstuffs using the first food gate 98 or second food gate 100 is desirable for a user who wishes to chop a large amount of foodstuffs having a predetermined size. For example, a user may wish to chop a large amount of nuts or crackers to a predetermined size. The processed or chopped foodstuffs that reach the container 94 may be dumped from the container 94 or may be used by an operator.

Referring to FIGS. 5, 14 and 17–21, in the second continuous operating mode 78, the food processor 10 is set up for operation in the second operating mode and the second tool 36 or slicer/shredder disk 36 is rotatably secured to the upper end 24a of the extender 24 as described above. Food is introduced into the sub-processing chamber 66 through the feed chute 90 and rests upon either the first or second faces 36a, 36b of the second tool 36 or slicer/shredder disk 36. The food processor 10 is actuated to operate by depressing one of the control buttons 108, which causes the drive shaft 14, extender 24, disk 60 and second tool 36 or slicer/shredder disk 36 to rotate. In the preferred embodiment, when the first face 36a is facing the feed chute 90, the slicer/shredder disk 36 slices foodstuffs introduced onto the first face 36a when the slicer/shredder 36 is rotating. The sliced foodstuffs are released onto the second disk surface 60b and are urged toward a periphery of the sub-processing chamber 66 by the ribs 68 where they either bounce off the inner surfaces of the sub-processing chamber 66 or are released from the sub-processing chamber 66 through the gap 86. Conversely, when the second face 36b of the slicer/shredder disk 36 is facing the feed chute 90, the foodstuffs introduced onto the second face 36b are shred. The shredded foodstuffs are urged toward a periphery of the sub-processing chamber 66 by the ribs 86 and either bounce off internal surfaces of the sub-processing chamber 66 or are released from the gap 86 into the food guard 92 and into the container 94. Continuously slicing and shredding of foodstuffs is convenient for a user who desires to slice or shred a generally large volume of foodstuffs. In addition, the use of the second tool 36 or slicer/shredder disk 36 for processing foodstuffs through various operations depending upon whether the first face 36a or second face 36b is facing the feed chute 90 permits flexibility.

Referring to FIG. 2, the individual functional components of the food processor 10 are removable from the housing 12 for easy cleaning. In addition, the individual components are easily engaged and disengaged from each other and from the housing 12 to permit simple changeover from the various operating modes and into the storage position.

Referring to FIGS. 1 and 2, to position the food processor 10 in the storage position from a completely disassembled condition, the bowl 16 is secured to the base 12b. The extender 24 is secured to the driveshaft 14 and the first tool 22 is secured to the lower end 24b of the extender 24. The disk 60 is secured to the upper end 24a of the extender 24 and the second tool 36 is secured to the upper end 24a of the extender 24 and to the second hub 64 of the disk 60. The lid 18 is secured to the bowl 16 such that the pin 106 engages the bore 32 of the extender 24 and the food pusher 88 is positioned within the feed chute 90. Finally, the first and second food gates 98, 100 are positioned within the central void 88a of the food pusher 88. Alternatively, the first and second food gates 98, 100 may be positioned within the bowl 16 at some point between securing the bowl 16 to the base 12b and securing the lid 18 to the bowl 16.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A food processor for processing foodstuffs comprising:
   a housing including a motor covering and a base;
   a drive shaft, the drive shaft protruding from the base and including a first end proximate the base and a second end distal therefrom;
   a bowl removably securable to the base;
   a lid removably securable to the bowl creating a processing chamber between inner surfaces of the bowl and lid;
   a first tool rotatably securable to the drive shaft adjacent the first end in a first operating mode and above a rim of the bowl in a second operating mode.

2. The food processor of claim 1 further comprising:
   an extender including an upper end and a lower end positionable between the first tool and the drive shaft, the extender being rotatably secured to the drive shaft to rotate therewith.

3. The food processor of claim 2 wherein in the first operating mode, at least one of the first tool is rotatably engaged with the lower end and a second tool is rotatably engaged with the upper end in the processing chamber.

4. The food processor of claim 2 further comprising:
   a disk including a first hub protruding from a first disk surface and a second hub protruding from a second disk surface, at least one of the first and second hubs being rotatably engageable with the upper end of the exchanger in the second operating mode creating a sub-processing chamber between at least one of the first and second disk surfaces and the inner surfaces of the lid.

5. The food processor of claim 4 further comprising:
   a second tool including a first face and a second face, the second tool being secured to the upper end for rotation therewith.

6. The food processor of claim 4 wherein at least one of the first tools is rotatably engaged with the first hub and the second tool is rotatably engaged with the second hub within the sub-processing chamber in the second operating mode.

7. The food processor of claim 5 wherein the first tool is comprised of an S-blade cassette for chopping foodstuffs and the second tool is comprised of a slicer/shredder disk for slicing foodstuffs using the first face and shredding foodstuffs using the second face.

8. The food processor of claim 5 further comprising:
   a gap adjacent the sub-processing chamber, the gap being closed in the first operating mode wherein the food processor operates to process foodstuffs within the processing chamber, the gap being at least partially exposed in the second operating mode wherein the food processor operates to continuously process foodstuffs for release from the sub-processing chamber through the gap.

9. The food processor of claim 8 further comprising:
   a food pusher, the lid including a feed chute and a food guard including a mouth extending from a peripheral side of the lid adjacent the gap, the food pusher being removably positioned within the feed chute.

10. The food processor of claim 9 wherein foodstuffs are introduced into the sub-processing chamber through the feed chute in the second operating mode, the foodstuffs being processed within the sub-processing chamber and released from the gap into the food guard, the food guard directing the processed foodstuffs into a container positioned adjacent the mouth.

11. A food processor for processing foodstuffs comprising:
    a housing including a motor covering and a base;
    a drive shaft including a first end and a second end, the drive shaft protruding from the base;
    a bowl removably securable to the base;
    a lid removably securable to the bowl enclosing a processing chamber between inner surfaces of the bowl and lid;
    a disk including a first surface, the disk being rotatably securable adjacent the second end creating a sub-processing chamber between the first surface and the inner surfaces;
    a gap in a peripheral surface of the sub-processing chamber, the gap permitting release of chopped foodstuffs from the sub-processing chamber;
    a first tool operatively associated with the drive shaft for rotation therewith, the first tool being positioned within the sub-processing chamber for chopping foodstuffs within the sub-processing chamber;
    a slot adjacent the gap; and
    a first food gate slideable within the slot for alternatively covering and opening the gap, the first food gate including a first end with a fine lattice and a second end with a coarse lattice, the first end permitting a predetermined size of chopped foodstuff to be released from the gap and the second end permitting a larger sized chopped foodstuff to be released from the gap.

12. The food processor of claim 11 wherein the first tool is an S-blade cassette.

13. The food processor for processing foodstuffs comprising:
    a housing including a motor covering and a base;
    a drive shaft protruding from the base;
    a bowl removably securable to the base;
    a lid including a feed chute, the lid being removably securable to the bowl creating a food processing chamber between inner surfaces of the bowl and lid;
    a food pusher slideably positionable within the feed chute;
    a gap including a slot adjacent the gap in a side surface of at least one of the bowl and lid;
    at least a first food gate and a second food gate slideably positionable within the slot;
    a disk rotatably securable to the drive shaft;
    at least a first tool and a second tool rotatably engageable with the drive shaft; and
    an extender having an upper and a lower end, the extender being rotatably secured to the drive shaft to rotate therewith, each of the disk, gates, tool, food pusher and extender being used in at least one of a first and second operating mode of the food processor and secured within the bowl and lid in a storage position.

14. The food processor of claim 13 wherein the first tool and second tool are comprised of an S-blade cassette and a slicer/shredder disk.

15. A food processor of claim 14 wherein the extender is secured to the drive shaft, the S-blade cassette is secured to the lower end, the disk is secured adjacent the upper end, the slicer/shredder disk is secured adjacent the upper end, the lid is secured to the bowl, the bowl is secured to the base and the first and second food gates are positioned within the bowl in the storage position.

16. The food processor of claim 13 wherein the extender is secured to the drive shaft, the first tool is secured to the lower end, the disk is secured adjacent the upper end, the second tool is secured adjacent the upper end, the lid is secured to the bowl, the bowl is secured to the base and the first and second food gates are positioned within a central void of the food pusher in the storage position.

17. A food processor for processing foodstuffs comprising:
   a housing including a motor covering and a base;
   a drive shaft protruding from the base;
   a bowl removably securable to the base;
   a lid removably securable to the bowl creating a processing chamber between inner surfaces of the bowl and lid;
   a gap in a peripheral surface of the processing chamber;
   a slot adjacent the gap; and
   a first food gate including a first end and a second end, the first food gate being positionable within the slot to selectively cover and expose the gap, the first and second ends permitting chopped foodstuff having predetermined sizes to exit the processing chamber when the first food gate covers the gap.

18. The food processor of claim 17 wherein the first food gate is slideable within the slot and includes at least a first position, a second position and a third position.

19. The food processor of claim 18 wherein the first end includes a fine lattice and the second end includes a coarse lattice.

20. The food processor of claim 19 wherein the gap is exposed in the first position, the gap is covered by the first end in the second position permitting a first predetermined size of chopped foodstuff to be released from the gap and the gap is covered by the second end in the third position permitting a second predetermined size of chopped foodstuff to be released from the gap, the second predetermined size being larger than the first predetermined size.

* * * * *